United States Patent
Yang et al.

(10) Patent No.: US 9,860,603 B2
(45) Date of Patent: Jan. 2, 2018

(54) METHOD AND APPARATUS FOR MANAGING APPLICATIONS BASED ON APPLICATION INFORMATION INCLUDED IN A BROADCASTING SIGNAL

(71) Applicant: LG ELECTRONICS INC., Seoul (KR)

(72) Inventors: Seungryul Yang, Seoul (KR); Kyoungsoo Moon, Seoul (KR); Seungjoo An, Seoul (KR); Jinwon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/036,310

(22) PCT Filed: Nov. 13, 2014

(86) PCT No.: PCT/KR2014/010903
§ 371 (c)(1),
(2) Date: May 12, 2016

(87) PCT Pub. No.: WO2015/072763
PCT Pub. Date: May 21, 2015

(65) Prior Publication Data
US 2016/0286279 A1 Sep. 29, 2016

Related U.S. Application Data

(60) Provisional application No. 61/903,902, filed on Nov. 13, 2013, provisional application No. 61/918,666, (Continued)

(51) Int. Cl.
*H04N 21/63* (2011.01)
*H04N 21/643* (2011.01)
(Continued)

(52) U.S. Cl.
CPC ......... *H04N 21/632* (2013.01); *H04L 67/02* (2013.01); *H04N 21/4126* (2013.01);
(Continued)

(58) Field of Classification Search
None
See application file for complete search history.

(56) References Cited

U.S. PATENT DOCUMENTS

| | | | |
|---|---|---|---|
| 2006/0010480 A1* | 1/2006 | Gaumond | H04N 7/17327 725/134 |
| 2007/0116427 A1 | 5/2007 | Youn | |
| 2008/0243869 A1 | 10/2008 | Choi et al. | |
| 2010/0121891 A1* | 5/2010 | Zampiello | G06F 17/30053 707/822 |
| 2012/0311038 A1* | 12/2012 | Trinh | G06F 21/33 709/204 |
| 2013/0055323 A1* | 2/2013 | Venkitaraman | H04N 21/4126 725/82 |
| 2013/0073673 A1* | 3/2013 | McMahon | H04L 67/1097 709/217 |
| 2013/0198298 A1* | 8/2013 | Li | H04N 21/41407 709/206 |
| 2014/0344848 A1* | 11/2014 | Busse | H04N 21/4122 725/28 |

(Continued)

FOREIGN PATENT DOCUMENTS

KR 10-0762564 B1 10/2007
KR 10-2008-0089001 A 10/2008
(Continued)

*Primary Examiner* — Hoang-Vu A Nguyen-Ba
(74) *Attorney, Agent, or Firm* — Birch, Stewart, Kolasch & Birch, LLP

(57) ABSTRACT

An embodiment of the present invention provides a method for managing applications of a broadcasting reception device and a companion device connected over a network. The method may include receiving a broadcasting signal, generating an application information list variable based on application information included in the broadcasting signal, receiving an application information-obtaining action from the companion device, the application information-obtaining action being indicative of a request message for obtaining information related to at least one specific application, transmitting an application information list variable corresponding to the at least one specific application in response to the application information-obtaining action, and providing a broadcasting service based on the transmitted application information list variable.

14 Claims, 40 Drawing Sheets

Related U.S. Application Data filed on Dec. 20, 2013, provisional application No. 61/927,455, filed on Jan. 14, 2014, provisional application No. 61/938,163, filed on Feb. 11, 2014, provisional application No. 61/939,716, filed on Feb. 13, 2014, provisional application No. 61/954,540, filed on Mar. 17, 2014, provisional application No. 61/976,472, filed on Apr. 7, 2014.

(51) Int. Cl.
    *H04N 21/6402*    (2011.01)
    *H04N 21/8545*    (2011.01)
    *H04N 21/482*     (2011.01)
    *H04N 21/637*     (2011.01)
    *H04N 21/41*      (2011.01)
    *H04L 29/08*      (2006.01)

(52) U.S. Cl.
    CPC ....... *H04N 21/4826* (2013.01); *H04N 21/637* (2013.01); *H04N 21/6402* (2013.01); *H04N 21/64322* (2013.01); *H04N 21/8545* (2013.01)

(56) References Cited

U.S. PATENT DOCUMENTS

2016/0072865 A1*  3/2016  Kaplinger ............... H04L 67/06
                                                          709/213
2016/0286279 A1*  9/2016  Yang .................. H04N 21/4126

FOREIGN PATENT DOCUMENTS

KR         10-0864482 B1    10/2008
KR         10-1234061 B1    2/2013
WO         WO 01/11869 A1   2/2001

\* cited by examiner

FIG. 21

|      | Action Name                       |
| ---- | --------------------------------- |
| 2100 | SearchAppInfo() or GetAppInfo()   |

|      | Argument        | Direction |
| ---- | --------------- | --------- |
| 2110 | AppID           | IN        |
| 2120 | RetrieveCriteria| IN        |
| 2130 | DeviceProfile   | IN        |
| 2140 | Filter          | IN        |
| 2150 | AppInfo         | OUT       |

FIG. 22

|  | Action Name |
|---|---|
| 2200 | SimpleGetAppInfo() |

|  | Argument | Direction |
|---|---|---|
| 2210 | AppID | IN |
| 2220 | AppInfo | OUT |

FIG. 23

|      | Action Name      |
| ---- | ---------------- |
| 2300 | GetAvailableApp() |

|      | Argument        | Direction |
| ---- | --------------- | --------- |
| 2310 | AppID           | IN        |
| 2320 | RetrieveCriteria | IN       |
| 2330 | DeviceProfile   | IN        |
| 2340 | Filter          | IN        |
| 2350 | AvailableApp    | OUT       |

FIG. 24

| | Action Name |
|---|---|
| 2400 | GetRunningApp() |

| | Argument | Direction |
|---|---|---|
| 2410 | RunningAppInfo | OUT |

FIG. 25

|  | Action Name |
|---|---|
| 2500 | GetRunningStatus() |

|  | Argument | Direction |
|---|---|---|
| 2510 | AppID | IN |
| 2520 | RunningStatus | OUT |

FIG. 26

|  | Action Name |
|---|---|
| 2600 | ActivateAppByID() |

|  | Argument | Direction |
|---|---|---|
| 2610 | AppID | IN |
| 2620 | Parameter | IN |

FIG. 27

|      | Action Name       |
|------|-------------------|
| 2700 | ActivateAppByURI() |

|      | Argument      | Direction |
|------|---------------|-----------|
| 2710 | ActivationURI | IN        |
| 2720 | AppInfo       | IN        |
| 2730 | Parameter     | IN        |
| 2740 | AppID         | OUT       |

FIG. 28

|  | Action Name |
|---|---|
| 2800 | DeactivateApp() |

|  | Argument | Direction |
|---|---|---|
| 2810 | AppIDs | IN |
| 2820 | StoppedAppIDs | OUT |

FIG. 29

| | Action Name |
|---|---|
| 2900 | InstallAppByID() |

| | Argument | Direction |
|---|---|---|
| 2910 | AppID | IN |
| 2920 | Parameter | IN |

FIG. 30

|      | Action Name      |
| ---- | ---------------- |
| 3000 | InstallAppByURI() |

|      | Argument       | Direction |
| ---- | -------------- | --------- |
| 3010 | InstallationURI | IN        |
| 3020 | AppInfo        | IN        |
| 3030 | Parameter      | IN        |
| 3040 | AppID          | OUT       |

FIG. 31

|  | Action Name |
|---|---|
| 3100 | UninstallApp() |

|  | Argument | Direction |
|---|---|---|
| 3110 | AppID | IN |
| 3120 | UnintalledAppIDs | OUT |

FIG. 32

|      | Action Name              |
|------|--------------------------|
| 3200 | GetAppInstallationStatus() |

|      | Argument           | Direction |
|------|--------------------|-----------|
| 3210 | AppIDs             | IN        |
| 3220 | InstallationStatus | OUT       |

FIG. 33

|      | Action Name          |
|------|----------------------|
| 3300 | GetAppConnectionInfo() |

|      | Argument       | Direction |
|------|----------------|-----------|
| 3310 | AppIDs         | IN        |
| 3320 | ConnectionInfo | OUT       |

FIG. 34

| | Action Name |
|---|---|
| 3400 | ConnectApptoApp() |

| | Argument | Direction |
|---|---|---|
| 3410 | AppID | IN |
| 3420 | ConnectionID | OUT |

FIG. 35

|  | Action Name |
|---|---|
| 3500 | DisconnectApptoApp() |

|  | Argument | Direction |
|---|---|---|
| 3510 | ConnectionIDs | IN |
| 3520 | DisconnectedConnectionIDs | OUT |

FIG. 36

|  | Action Name |
|---|---|
| 3600 | GetCurrentConnectionInfo() |

|  | Argument | Direction |
|---|---|---|
| 3610 | ConnectionIDs | IN |
| 3620 | ConnectionAppIDs | OUT |

FIG. 37

|  | Action Name |
|---|---|
| 3700 | GetSupportedTargetFields() |

|  | Argument | Direction |
|---|---|---|
| 3710 | SupportedTargetFields | OUT |

FIG. 38

|  | State Variable name | Data type |
|---|---|---|
| 3801 | AppInfoList | string |
| 3802 | MSSAvailableApp | string |
| 3803 | SupportedTargetFields | string |
| 3804 | A_ARG_TYPE_AppID | string |
| 3805 | A_ARG_TYPE_Target | string |
| 3806 | A_ARG_TYPE_TargetFields | string |
| 3807 | A_ARG_TYPE_Filter | string |
| 3808 | RunningAppList | string |
| 3809 | A_ARG_TYPE_URI | string |
| 3810 | A_ARG_TYPE_Parameters | string |
| 3811 | A_ARG_TYPE_Parameters | string |

METHOD AND APPARATUS FOR MANAGING APPLICATIONS BASED ON APPLICATION INFORMATION INCLUDED IN A BROADCASTING SIGNAL

CROSS REFERENCE TO RELATED APPLICATIONS

This application is the National Phase of PCT International Application No. PCT/KR2014/010903, filed on Nov. 13, 2014, which claims priority under 35 U.S.C. 119(e) to U.S. Provisional Application Nos. 61/903,902, filed on Nov. 13, 2013, 61/918,666 filed on Dec. 20, 2013, 61/927,455, filed on Jan. 14, 2014, 61/938,163, filed on Feb. 11, 2014, 61/939,716, filed on Feb. 13, 2014, 61/954,540, filed on Mar. 17, 2014, and 61/976,472 filed on Apr. 7, 2014, all of which are hereby expressly incorporated by reference into the present application.

TECHNICAL FIELD

The present invention relates to a method and apparatus for managing a connection between a plurality of devices connected over a network and, more particularly, to a method and apparatus for managing applications and establishing a connection between applications in order to provide an interactive service between a broadcasting reception device and another device.

BACKGROUND ART

Unlike in analog broadcasting, in digital broadcasting, one broadcasting service may include a plurality of media components. Accordingly, users can selectively watch a plurality of media for the one broadcasting service.

Furthermore, a user can be provided with various kinds of services in addition to a broadcasting service and can improve efficiency of device control through interoperability between different devices connected to a device that receives a broadcasting service over a network.

In a related art, however, inefficiency in the provision of services is present because a specific kind of service based on a specific technology must be defined according to a standard protocol in order to guarantee compatibility between different devices connected over a network. Accordingly, there is a need for a method capable of providing various kinds of services in addition to a broadcasting service even without a protocol for interoperability between devices connected over a network.

DISCLOSURE

Technical Problem

An embodiment of the present invention provides a method for providing a broadcasting content service through a reception apparatus of an IP-based next-generation hybrid broadcasting system.

An embodiment of the present invention provides a method for providing an interactive service between a broadcasting reception device and another device connected over a network.

Furthermore, an embodiment of the present invention provides a method for providing an interactive service by implementing an interactive service so that a plurality of devices connected over a network always runs the interactive service.

Furthermore, an embodiment of the present invention provides a method for providing an interactive service by enabling a device to notify a user that what application needs to be installed and executed.

Furthermore, an embodiment of the present invention provides a method for enabling the management of an application of the other device, such as installation, running, running stop, and uninstallation, through one device.

Furthermore, an embodiment of the present invention provides a method for enabling a permitted specific user or device only to manage an application of another device.

Furthermore, an embodiment of the present invention provides a method for sharing information for an interaction between applications of a plurality of devices.

Furthermore, an embodiment of the present invention provides a method capable of simultaneously supporting connections between a plurality of devices by identifying the connections between the plurality of devices.

Furthermore, an embodiment of the present invention provides a clock synchronization or content synchronization method in order to provide an interactive service between a plurality of devices.

Furthermore, an embodiment of the present invention provides a method for discovering a device supporting the management, connection management, and synchronization of applications of a plurality of devices.

Furthermore, an embodiment of the present invention provides a method for exchanging additional information about the management, connection management, and synchronization service of applications of a plurality of devices.

Technical Solution

An embodiment of the present invention provides a method for managing applications of a broadcasting reception device and a companion device connected over a network, including receiving a broadcasting signal, generating an application information list variable based on application information included in the broadcasting signal, receiving an application information-obtaining action from the companion device, the application information-obtaining action being indicative of a request message for obtaining information related to at least one specific application, transmitting an application information list variable corresponding to the at least one specific application in response to the application information-obtaining action, and providing a broadcasting service based on the transmitted application information list variable.

In an embodiment of the present invention, the method may further include extracting media content and the application information from the broadcasting signal through an ATSC 3.0 protocol stack. The broadcasting signal may be transmitted through at least one of a broadcast and a broadband.

In an embodiment of the present invention, the at least one specific application may be identified by an application identifier included in the application information-obtaining action.

In an embodiment of the present invention, the method may further include receiving a connection information-obtaining action from the companion device, the connection information-obtaining action being used to obtain connection information between applications of the broadcasting reception device and the companion device, transmitting the connection information to the companion device in response to the connection information-obtaining action, the connection information including at least one of protocol information and connection address information, and performing a connection between the applications of the broadcasting reception device and the companion device based on the connection information.

In an embodiment of the present invention, the broadcasting reception device may support at least one of an application management service, an application connection setup service, and a synchronization service between devices.

In an embodiment of the present invention, the method may further include device based on application trigger information and transmitting information related to the specific application to the companion device. The application trigger information may be included in the extracted application information.

In an embodiment of the present invention, the method may further include transmitting an application running action or an application installation action to the companion device based on the information of the specific application. The application running action may include the identifier and installation parameter of the specific application. The application installation action may include the identifier and installation parameter of the specific application.

An embodiment of the present invention provides a broadcasting reception device for managing a connection with an application within a companion device connected to the broadcasting reception device over a network, including a tuner configured to receive a broadcasting signal and a controller configured to generate an application information list variable based on application information included in the broadcasting signal, to transmit an application information list variable corresponding to at least one specific application in response to an application information-obtaining action received from the companion device, and to provide a broadcasting service based on the transmitted application information list variable. The application information-obtaining action may be indicative of a request message for obtaining information related to the at least one specific application.

In an embodiment of the present invention, the controller may extract media content and the application information from the broadcasting signal through an ATSC 3.0 protocol stack. The broadcasting signal may be transmitted through at least one of a broadcast and a broadband.

In an embodiment of the present invention, the broadcasting reception device may further include a network interface configured to receive a connection information-obtaining action from the companion device. The connection information-obtaining action may be used to obtain connection information between applications of the broadcasting reception device and the companion device. The controller may transmit the connection information to the companion device in response to the connection information-obtaining action, and may perform a connection between applications of the broadcasting reception device and the companion device based on the connection information. The connection information may include at least one of protocol information and connection address information.

In an embodiment of the present invention, the controller may execute a specific application within the broadcasting reception device based on application trigger information and transmits information related to the specific application to the companion device. The application trigger information may be included in the extracted application information.

In an embodiment of the present invention, the controller may transmit an application running action or an application installation action to the companion device based on the information of the specific application. The application running action may include the identifier and installation parameter of the specific application. The application installation action may include the identifier and installation parameter of the specific application.

Advantageous Effects

In accordance with an embodiment of the present invention, in order to interoperate a new type of service between devices connected over a network in addition to a next-generation broadcasting service, the corresponding service itself does not need to be standardized. Inefficiency in which all of basic protocols for interoperability between devices other than a function unique to a service have to be included in the corresponding service itself can be obviated. Accordingly, everybody can easily provide an interactive service in an application form, and a manufacturer can reduce additional development resources necessary to provide such a service.

DESCRIPTION OF DRAWINGS

FIGS. 12 and 13 are embodiments to which the present invention may be applied, wherein FIG. 12 shows basic architecture to which a multi-screen service is applied and FIG. 13 shows architecture to which an extended multi-screen service is applied.

FIGS. 21 to 37 illustrate actions for application management and arguments thereof according to embodiments to which the present invention may be applied.

FIG. 21 shows a first application information-obtaining action and arguments thereof according to an embodiment to which the present invention may be applied.

FIG. 22 shows a second application information-obtaining action and arguments thereof according to an embodiment to which the present invention may be applied.

FIG. 23 shows an available application information-obtaining action and arguments thereof according to an embodiment to which the present invention may be applied.

FIG. 24 shows a running application information-obtaining action and an argument thereof according to an embodiment to which the present invention may be applied.

FIG. 25 shows a running status information-obtaining action and arguments thereof according to an embodiment to which the present invention may be applied.

FIG. 26 shows a first application activation action and arguments thereof according to an embodiment to which the present invention may be applied.

FIG. 27 shows a second application activation action and arguments thereof according to an embodiment to which the present invention may be applied.

FIG. 28 shows a deactivation action and arguments thereof according to an embodiment to which the present invention may be applied.

FIG. 29 shows a first application installation action and arguments thereof according to an embodiment to which the present invention may be applied.

FIG. 30 shows a second application installation action and arguments thereof according to an embodiment to which the present invention may be applied.

FIG. 31 shows an uninstallation action and arguments thereof according to an embodiment to which the present invention may be applied.

FIG. 32 shows an installation status information-obtaining action and arguments thereof according to an embodiment to which the present invention may be applied.

FIG. 33 shows a connection information-obtaining action and arguments thereof according to an embodiment to which the present invention may be applied.

FIG. 34 shows an apptoapp connection (i.e., connection between applications) action and arguments thereof according to an embodiment to which the present invention may be applied.

FIG. 35 shows an apptoapp disconnection (i.e., disconnection between applications) action and arguments thereof according to an embodiment to which the present invention may be applied.

FIG. 36 shows a current connection information-obtaining action and arguments thereof according to an embodiment to which the present invention may be applied.

FIG. 37 shows a searchable field-obtaining action and an argument thereof according to an embodiment to which the present invention may be applied.

FIG. 38 shows state variables for application management according to an embodiment to which the present invention may be applied.

MODE FOR INVENTION

Figure 1:
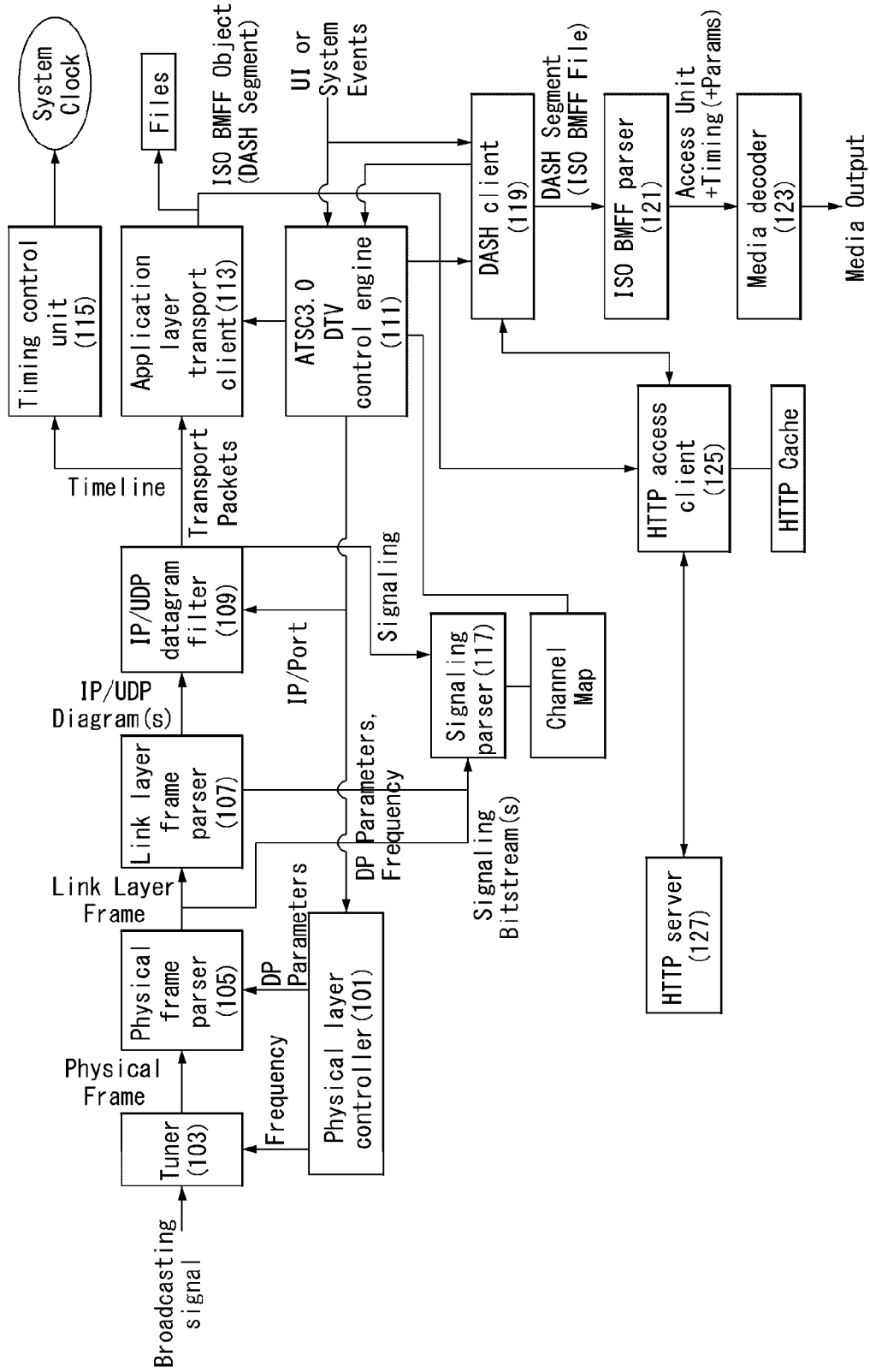
FIG. 1 shows the configuration of the receiver of an IP-based next-generation hybrid broadcasting system according to an embodiment to which the present invention may be applied.

A Universal Plug and Play (hereinafter referred to as "UPnP") technology and a digital living network alliance (hereinafter referred to as "DLNA") technology enable services and control between home appliances of various manufacturers. In particular, the UPnP technology enables compatible Audio-Visual (AV) services and control between AV devices. The compatible AV services include media streaming, uploading, and downloading.

A UPnP-based network proposed for home networking basically includes a plurality of UPnP devices, services, and a Control Point (CP) logically. In a UPnP network, service means the smallest control unit in a network and is modeled through state variables.

In a UPnP-based network, a CP means a control application having a function for detecting and controlling other devices and/or services. The CP may be operated in a specific device, for example, a physical device, such as a mobile device that is easy to handle by a user.

A UPnP-based AV home network includes a Media Server (MS) for providing media data to the home network, a Media Renderer (MR) for playing back media data over the home network, and an AV Control Point (CP) for controlling the MS and the MR. The MS and the MR are controlled devices controlled by a CP.

The MS (more specifically, a Content Directory Service (CDS) within the MS) has previously constructed information about media files and containers (corresponding to directories) gathered therein in the form of each of pieces of object information. The "object" is a term collectively referring to an item having information about one or more media files, for example, pictures, moving images, or audio files and a container having information about a directory.

The term "object" may be used as a term referring to an "item" or "container" according to circumstances.

Furthermore, a single item corresponds to one or a plurality of media files. For example, a plurality of media files having the same contents of content with different bit rates may be managed as a single item.

Information about an object is also called "metadata." A variety of types of information about associated content are written in the metadata. For example, an ID assigned to an object corresponding to content, identification information about a container to which the object belongs, a title, information about whether the object is an item or container, the type of media, and a protocol and access position information from which associated content (e.g., a media file) may be obtained are written in the metadata. Furthermore, such metadata is written in a mark-up language form and is stored in storage managed by a CDS regardless of storage in which an associated media file is stored. In this case, the metadata may be stored in a mobile recording medium and provided to the CDS. The metadata of content written as described above is provided according to an action fetched by a control point. Furthermore, part of or the entire metadata may be provided to an MR through the medium of the control point.

In an embodiment of the present invention, UPnP may categorize such devices into a Control Point (CP) device and a control target device. A Digital Media Controller (DMC) and a Digital Media Player (DMP) may be categorized as a CP device, and a Digital MR (DMR), a Digital Media Server (DMS), a Digital Media Printer (DMPr) may be categorized as a control target device.

Furthermore, when a CP device of UPnP or a DMP of DLNA or a DMC requests content metadata from a control target device of UPnP or a DMS of DLNA, the control target device or the DMS may collect a plurality of content metadata (i.e., a list of generated content) corresponding to stored content, respectively, and may transmit them to the CP device or the DMP.

DLNA may define a Digital Media Server (DMS), a Digital Media Player (DMP), a Digital Medial Renderer (DMR), a Digital Media Controller (DMC), and a Digital Media Printer (DMPr), that is, home network devices, and may define a Mobile Digital Media Server (M-DMS), a Mobile Digital Media Player (M-DMP), a Mobile Digital Media Uploader (M-DMU), a Mobile Digital Media Downloader (M-DMD), and a Mobile Digital Media Controller (M-DMC), that is, mobile portable devices. Hereinafter, the DMS may be used as a concept covering the M-DMS, the DMP may be used as a concept covering the M-DMP, and the DMC may be used as a concept covering the M-DMC.

Furthermore, DLNA may be defined by a 2 box model and a 3 box model. The 2 box model includes the DMP and the DMS. In the 2 box model, the DMP enables a user to search for content browsed and distributed by the DMS and to play back the retrieved content. The 3 box model includes the DMC, the DMS, and the DMR. In the 3 box model, the DMC enables a user to search for the content of the DMS to be played back by the DMR.

In an embodiment of the present invention, upon Device to Device (D2D) communication, it may be presented that messages, commands, calls, actions, or requests/responses are exchanged.

In an embodiment of the present invention, in order to deliver a message used upon D2D communication to a required target device, various protocols, such as an Internet Control Message Protocol (ICMP) and an Internet Group Management Protocol (IGMP), in addition to an Internet Protocol (IP) may be used, and the present invention is not limited and applied to a specific protocol.

In an embodiment of the present invention, in order to stably deliver a message used upon D2D communication, control a message flow, solve a collision or congestion between a plurality of messages, and support multiplexing, various protocols, such as a Datagram Congestion Control Protocol (DCCP) and a Stream Control Transmission Protocol (SCTP), in addition to a Transmission Control Protocol (TCP) and a User Datagram Protocol (UDP) may be used, and the present invention is not limited and applied to a specific protocol.

In an embodiment of the present invention, in order to contain a message used upon D2D communication in a variety of pieces of information and deliver it for various purposes, various protocols, such as a Hypertext Transfer Protocol (HTT), a Real-time Transport Protocol (RTP), an Extensible Messaging and Presence Protocol (XMPP), and a File Transfer Protocol (FTP), may be used, and the present invention is not limited and applied to a specific protocol.

In an embodiment of the present invention, when a message used upon D2D communication is delivered through the various protocols, required message data may be contained in various message components, such as the message header and message body of message components defined in each protocol, and delivered, and the present invention is not limited to a specific message component.

In an embodiment of the present invention, when a message used upon D2D communication is delivered through the various protocols, data to be delivered may be delivered in various forms (e.g., a string, an integer, a floating point, Boolean, a character, an array, and a list) defined in each protocol. In order to represent, deliver, and store the data of complicated contents more structurally, a markup method, such as an Extensible Markup Language (XML), a Hypertext Markup Language (HTML), an Extensible Hypertext Markup Language (XHTML), or a JavaScript Object Notation (JSON), text, or an image format may be used, and the present invention is not limited to a specific method.

In an embodiment of the present invention, data included in a message used upon D2D communication may be delivered using various data compression technologies, such as "gzip" (RFC 1952), "deflate" (RFC 1950), and "compress" (RFC 2616), and the present invention is not limited to a specific method.

A UPnP method, that is, one of D2D communication methods applied to embodiments of the present invention, is a D2D communication protocol that belongs to the various technologies and that is a combination of the IP-TCP/UDP-HTTP protocols.

All of UPnP actions proposed according to an embodiment of the present invention may be applied through a combination of various forms of the various layer technologies. All of contents proposed according to an embodiment of the present invention are not limited to a UPnP method. That is, in this specification, a UPnP method is basically described as an embodiment for forming a network, but the present invention is not limited thereto and may be applied to the technologies of the aforementioned methods.

FIG. 1 shows the configuration of the receiver of an IP-based next-generation hybrid broadcasting system according to an embodiment to which the present invention may be applied.

A broadcasting service provided by an IP-based next-generation hybrid broadcasting system applied to an embodiment of the present invention may include service elements. For example, the service elements may include a continuous component, an elementary component, a composite component, a presentable component, a non-real-time file, non-real-time content, an application component, and an ATSC 3.0 application component.

The continuous component may be indicative of a content component which is present within continuous streams, such as audio, video, or captions. The elementary component may be indicative of a continuous component, that is, single encoding, for example, single encoding of a sound sequence and single encoding of a picture sequence. The composite component may be indicative of an aggregate of continuous components.

The presentable component is indicative of a component seen by a user. The non-real-time file is indicative of a file delivered in a non-real time. The non-real-time content is indicative of content having an aggregate of one or more non-real-time files.

The application component may be indicative of an aggregate of pieces of document forming an interactive service or a multi-screen service. For example, the piece of document may include HTML, Javascript, CSS, XML, and a multimedia file.

The ATSC 3.0 application component is indicative of an application suitable for an ATSC 3.0 application running environment. For example, an application applied to an embodiment of the present invention may be the ATSC 3.0 application component.

A broadcasting service applied to an embodiment of the present invention may be a linear service or an App-based service. In this case, the linear service may include content including continuous components consumed according to a broadcasting schedule. For example, the linear service may include at least one of one or more continuous components, a time base for component synchronization, and an App-based enhancement factor.

The App-based service is indicative of a non-real-time service based on an application which provides a user interface and a service function. The App-based service may include one or more App-based enhancement factors. The App-based enhancement factor may include at least one of one or more applications, non-real-time content, and an on-demand factor.

Referring to FIG. 1, the receiver of L the IP-based next-generation hybrid broadcasting system to which an embodiment of the present invention may be applied may be configured to include a physical layer controller 101, a tuner 103, a physical frame parser 105, a link layer frame parser 107, an IP/UDP datagram filter 109, an ATSC 3.0 DTV control engine 111, an application layer transport client 113, a timing control unit 115, a signaling parser 117, a DASH client 119, an ISO-Based Media File (BMFF) parser 121, a media decoder 123, an HTTP access client 125, and an HTTP server 127.

The physical layer controller 101 may control the operations of the tuner, the physical frame parser, etc. using RF information of a broadcasting channel to be received.

The tuner 103 may receive and process a broadcasting-related signal through a terrestrial wave broadcasting channel, and may convert the broadcasting-related signal into a proper form, for example, a physical frame. In this case, the broadcasting-related signal may include application information for providing an interactive service between devices in addition to media content.

The physical frame parser 105 may parse a received physical frame and obtain a link layer frame through related processing.

The link layer frame parser 107 may obtain link layer signaling from a link layer frame or perform operation related to the acquisition of an IP/UDP datagram.

The IP/UDP datagram filter 109 may filter a specific IP/UDP datagram from received IP/UDP datagrams.

The ATSC 3.0 DTV control engine 111 is responsible for an interface between modules, and may control the operation of each module through a parameter, etc. Action and arguments described in various embodiments of the present invention may be controlled by the ATSC 3.0 DTV control engine.

The application layer transport client 113 may process an application layer transport packet. In this case, the application layer transport packet means a transport protocol packet supporting real-time object transport, and may include, for example, packets, such as Real-Time Object Delivery over Unidirectional Transport (ROUTE) and MPEG Media Transport (MMT). Furthermore, the application layer transport client 113 may generate one or more ISO base media file format objects through the collection and processing of several packets.

The timing control unit 115 may process a packet including system time information, and may control a system time based on the processed packet.

The signaling parser 117 may obtain and parse DTV broadcasting service-related signaling and generate and manage a channel map, etc. based on the DTV broadcasting service-related signaling.

The DASH client 119 may perform real-time streaming or adaptive streaming-related operation and processing on obtained DASH segments.

The ISO-Based Media File (BMFF) parser 121 may extract audio and video data and related parameters from an ISO base media file format object.

The media decoder 123 may perform decoding and presentation on received audio and video data.

The HTTP access client 125 may request specific information from an HTTP server or may process a response to the request which is received from the HTTP server.

The HTTP server 127 may process a request received from the HTTP access client or provide a response to the request.

Figure 2:
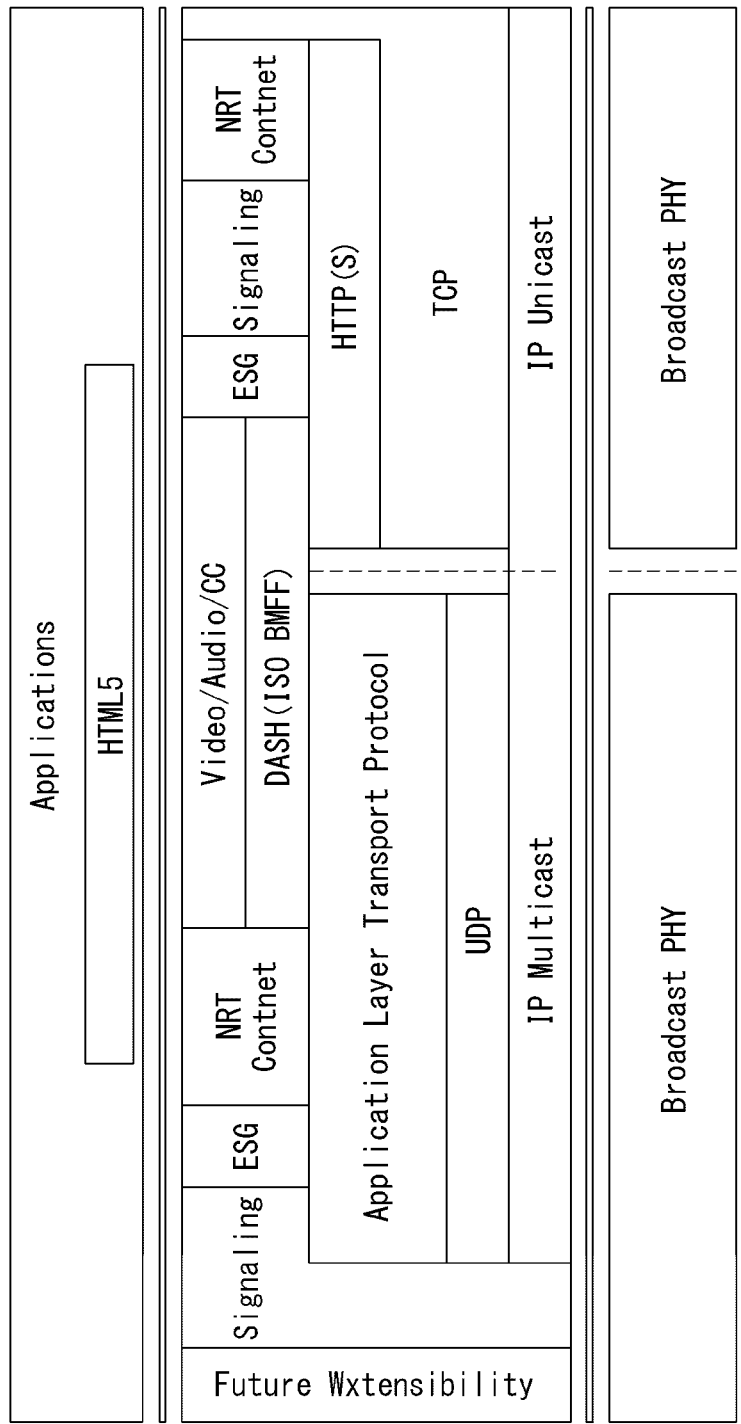
FIG. 2 shows the protocol stack of the IP-based next-generation hybrid broadcasting system according to an embodiment to which the present invention may be applied.

FIG. 2 shows the protocol stack of the IP-based next-generation hybrid broadcasting system according to an embodiment to which the present invention may be applied.

As shown in FIG. 2, on the transmission side of a next-generation broadcasting system supporting IP-based hybrid broadcasting, the audio or video data of a broadcasting service may be encapsulated in an ISO base media file format form. This may comply with a form, such as a DASH segment or the Media Processing Unit (MPU) of MPEG Media transport (MMT). Furthermore, the transmission side may transmit the audio or video data to broadcasting network and the Internet identically or according to the attributes of each transport network.

In the case of a broadcasting network, data encapsulated in an ISO Base Media File (ISO BMFF) form is encapsulated into an application layer transport protocol packet supporting real-time object transport, for example, a packet, such as Real-Time Object Delivery over Unidirectional Transport (ROUTE) or MPEG Media Transport (MMT). Furthermore, the encapsulated packet may be generated into an IP/UDP datagram, may be carried on a broadcasting signal, and may be transmitted.

In the case of the Internet, the packet may be delivered to the reception side based on a streaming scheme, such as DASH. Furthermore, signaling of a broadcasting service may be transmitted using the following method.

In the case of a broadcasting network, the packet may be transmitted through a specific Data Pipe (DP) of a transport frame delivered to the physical layer of a next-generation broadcasting transmission system and a broadcasting network depending on the attributes of signaling. In this case, a signaling form may be a form encapsulated into a bit stream or IP/UDP datagram.

In the case of the Internet, signaling data may be returned and delivered as a response to a request from the receiver.

ESG or NRT content of a broadcasting service may be transmitted using the following method.

In the case of a broadcasting network, the packet is encapsulated into an application layer transport protocol packet, for example, a transport packet, such as Real-Time Object Delivery over Unidirectional Transport (ROUTE) or MPEG Media Transport (MMT). Furthermore, the encapsulated packet may be generated into an IP/UDP datagram, may be carried on a broadcasting signal, and may be transmitted.

In the case of the Internet, ESG or NRT content may be returned and delivered as a response to a request from the receiver.

A broadcasting service according to an embodiment of the present invention may provide additional services, such as an HTML5 application, an interactive service, an ACR service, a second screen service, and a personalization service, in addition to audio/video (A/V) data.

Such broadcasting services may be transmitted through a physical layer, that is, a broadcasting signal, such as terrestrial waves or cable satellites. Furthermore, a broadcasting service according to an embodiment of the present invention may be transmitted through an Internet communication network (broadband).

If a broadcasting service is transmitted through a physical layer, that is, a broadcasting signal, such as terrestrial waves or cable satellites, a broadcasting reception apparatus may extract a high-speed information channel and an encapsulated IP datagram by demodulating the broadcasting signal. The broadcasting reception apparatus may extract a User Datagram Protocol (UDP) datagram from the IP datagram. The broadcasting reception apparatus may extract signaling information from the UDP datagram.

The broadcasting reception apparatus may extract a Real-Time Object Delivery over Unidirectional Transport (ROUTE) packet. In this case, the ROUTE packet may include Non-Real Time (NRT) data and Electronic Service Guide (ESG) data. Furthermore, the broadcasting reception apparatus may extract an application layer transport protocol packet from the UDP datagram. The broadcasting reception apparatus may extract AN data and additional data from the application layer transport protocol packet.

If a broadcasting service is transmitted through the Internet communication network (broadband), the broadcasting reception apparatus may receive an IP packet from the Internet communication network. The broadcasting reception apparatus may extract a TCP packet from the IP packet. The broadcasting reception apparatus may extract an HTTP packet from the TCP packet. The broadcasting reception apparatus may extract A/V data, additional data, and signaling information from the HTTP packet.

Figure 3:
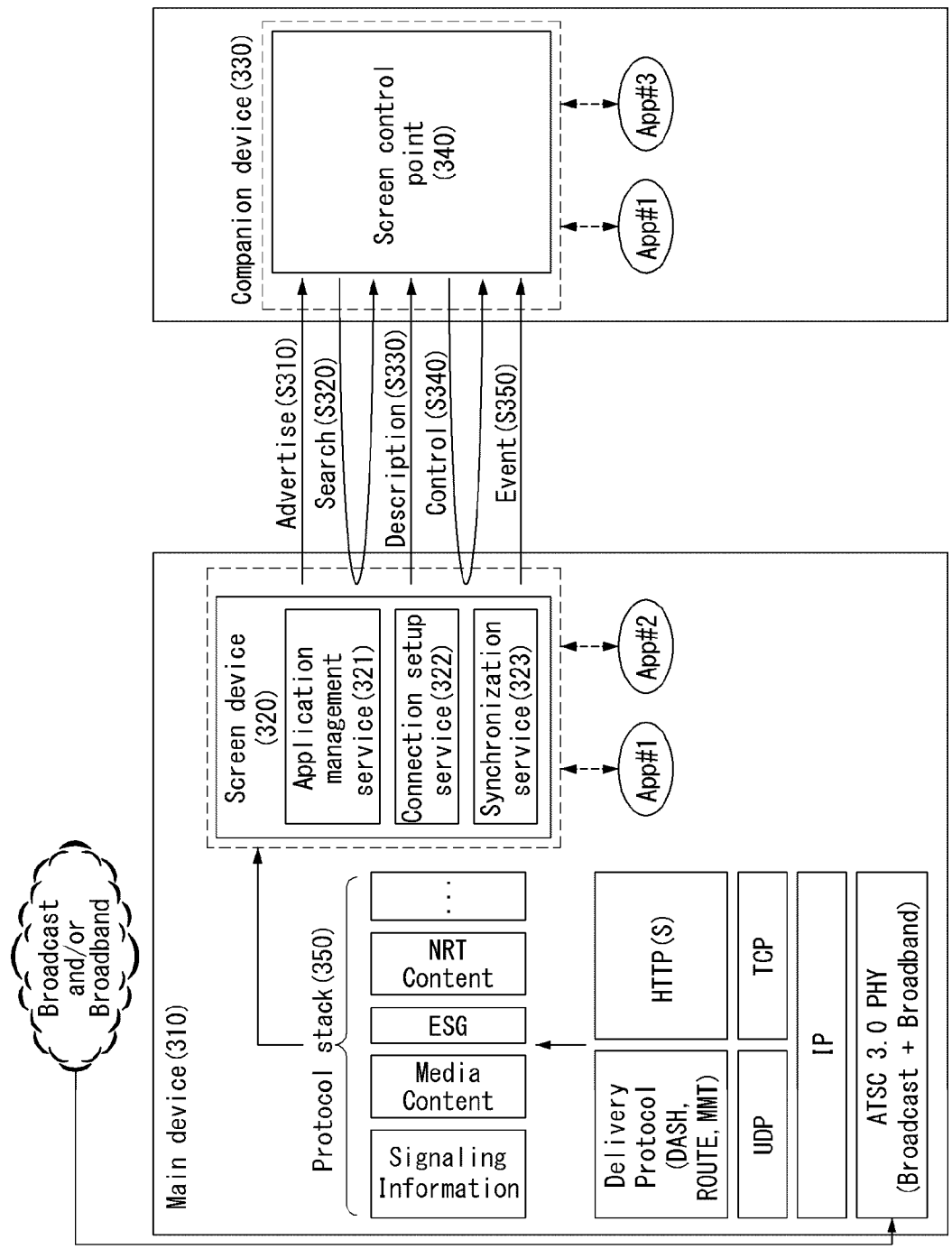
FIG. 3 shows basic architecture for providing a multi-screen service between a broadcasting reception device and a companion device according to an embodiment to which the present invention may be applied.

FIG. 3 shows basic architecture for providing a multi-screen service between a broadcasting reception device and a companion device according to an embodiment to which the present invention may be applied.

It is assumed that various devices are connected to a network providing a multi-screen service. The devices connected over the network may be categorized into a main screen device and a companion screen device depending on the role of a specific application and/or a method of using the specific application.

First, a main screen device is indicative of a device controlled by a companion screen device. For example, the main screen device may include a lean-back display device, such as TV or a set-top box. Furthermore, any display device may become the main screen device depending on a use scenario. For example, a device, such as a smart phone or a tablet, may become the main screen device.

The companion screen device is indicative of a device controlling the main screen device. For example, the companion screen device may include a lean-forward display device or a handheld display device, such as a smart phone or a tablet. Furthermore, any display device may become the companion screen device depending on a use scenario. For example, a device, such as TV or a set-top box, may become the companion screen device.

Meanwhile, a screen device may mean a component which is performed along with a screen control point and which is used to provide various interactive services to another display device. The screen device may be designed to be controlled by the screen control point and to operate in conjunction with the screen control point. In order to support a multi-screen service, it is recommenced that a screen device operates as a main screen device (e.g., a lean-back display device, such as TV or a set-top box) controlled by a companion screen device. Furthermore, in order to support an extended multi-screen service, it is recommenced that a screen device operates as a companion screen device (e.g., a lean-forward display device or handheld display device, such as a smart phone or a tablet) that controls a main screen device.

A screen control point is indicative of a component which is performed along with a screen device and which is used to provide various interactive services to another display device. The screen control point may be designed to control the screen device in response to a user input and to operate in conjunction with the screen device. In order to support a multi-screen service, it is recommended that a screen control point operates as a companion screen device (e.g., a lean-forward display device or handheld display device, such as a smart phone or a tablet) that controls a main screen device. Furthermore, in order to support an extended multi-screen service, it is recommended that a screen control point operates as a main screen device (e.g., a lean-back display device, such as TV or a set-top box) controlled by a companion screen device.

FIG. 3 shows architecture for providing an interactive service based on two of a variety of types of devices connected over a network, for example, a main device 310 and a companion device 330. In this case, the companion device 330 may operate as a screen control point 340, and the main device 310 may operate as a screen device 320.

The main device 310 may receive a broadcasting signal transmitted through broadcast and/or a broadband. The main device 310 may extract a transport packet from the broadcasting signal, and may extract media content and application information from the transport packet through a protocol stack 350. In this case, the protocol stack 350 schematically shows the protocol stack of FIG. 2, and the contents described with reference to FIG. 2 may be applied to the protocol stack 350.

For example, the main device 310 may receive a broadcasting signal through the ATSC 3.0 physical layer.

If the broadcasting service is transmitted through a physical layer, that is, a broadcasting signal, such as terrestrial waves or cable satellites, the main device 310 may extract a high-speed information channel and an encapsulated IP datagram by demodulating the broadcasting signal.

The main device 310 may extract a User Datagram Protocol (UDP) datagram from the IP datagram and extract signaling information from the UDP datagram.

The main device 310 may extract a Real-Time Object Delivery over Unidirectional Transport (ROUTE) packet. In this case, the ROUTE packet may include Non-Real Time (NRT) data and Electronic Service Guide (ESG) data.

Furthermore, the main device 310 may extract an application layer transport protocol packet from the UDP datagram and extract A/V data and additional data from the application layer transport protocol packet.

If the broadcasting service is transmitted through an Internet communication network (broadband), the main device 310 may receive an IP packet over the Internet communication network and extract a TCP packet from the IP packet. Furthermore, the main device 310 may extract an HTTP packet from the TCP packet and extract A/V data, additional data, and signaling information from the HTTP packet.

The main device 310 and the companion device 330 may provide a multi-screen service based on the extracted information.

The main device 310 may support at least one of an application management service, a connection setup service, and a synchronization service. The main device 310 may provide notification that it is a screen device by transmitting an advertising message or may provide notification of an address by which device description document including information may be accessed.

The companion device 330 may discover a screen device in order to provide a multi-screen service. In this case, a discovery action "Search( )" may be used. If, as a result of the discovery, a screen device is discovered, the discovered screen device may transmit a response message for the discovery action.

Furthermore, the main device 310 may transmit description information to the companion device 330. For example, the description information may include basic device information, information (e.g., a screen device or a screen control point) about the type of the main device 310, and information (e.g., an application management service or a connection setup service) about a service which may be provided by the main device 310.

Furthermore, the companion device 330 may transmit an action for controlling the main device 310. The main device 310 may transmit an event message to the companion device 330 or transmit a response message for the action.

Figure 4:
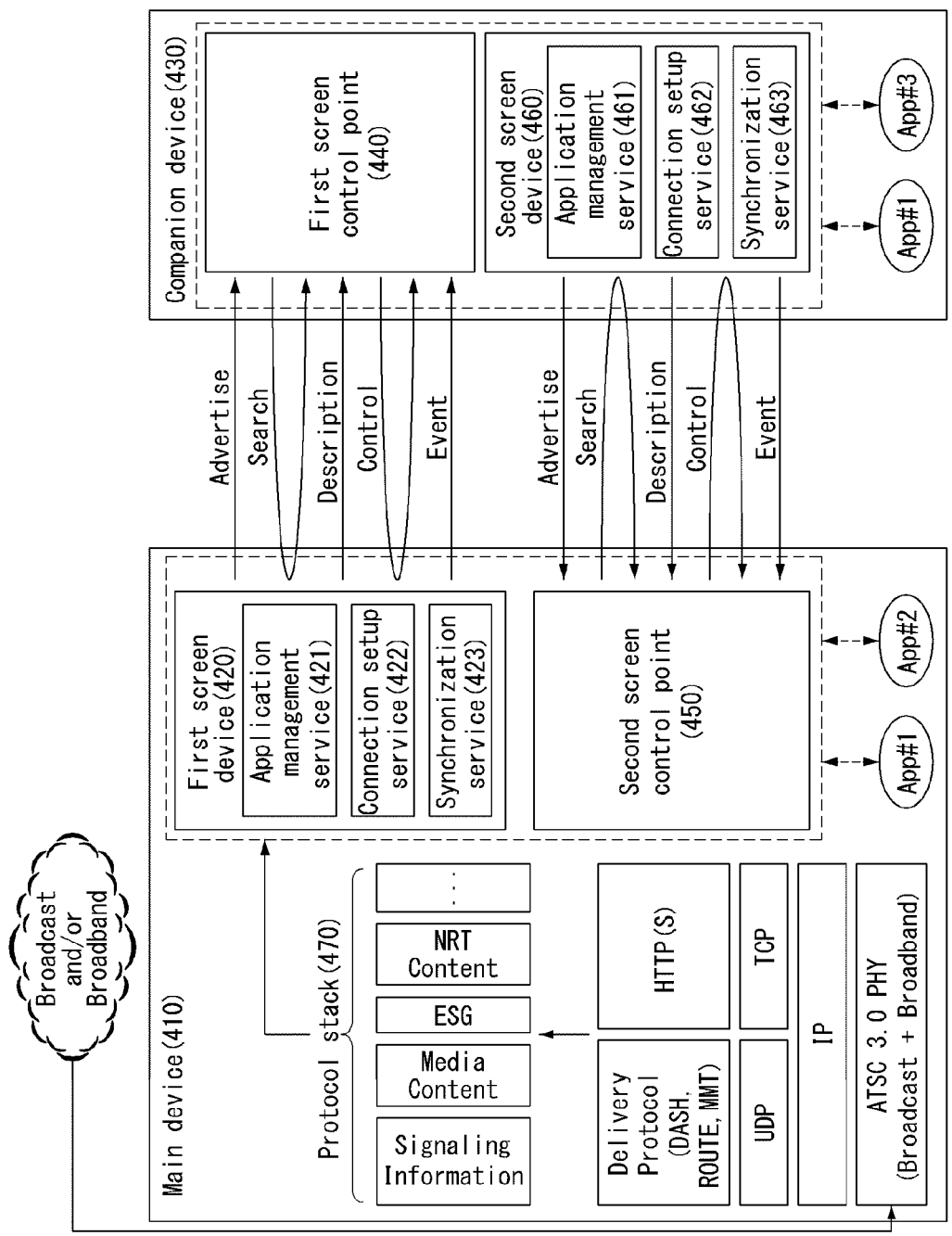
FIG. 4 shows extended architecture for providing a multi-screen service between a broadcasting reception device and a companion device according to an embodiment to which the present invention may be applied.

FIG. 4 shows extended architecture for providing a multi-screen service between a broadcasting reception device and a companion device according to an embodiment to which the present invention may be applied.

An embodiment of the present invention may provide an extended multi-screen service. In this case, the extended multi-screen service may mean a service that requires more sophisticated interactions.

FIG. 4 shows architecture for providing an extended multi-screen service based on two devices connected over a network, for example, a companion device 430 and a main device 410.

An operation between the first screen device 420 and the first screen control point 440 has been described above with reference to FIG. 3.

Furthermore, the main device 410 may operate as a second screen control point 450, and the companion device 430 may operate as a second screen device 460. Likewise, the contents described with reference to FIG. 3 may be applied to an operation between the second screen device 460 and the second screen control point 450.

Figure 5:
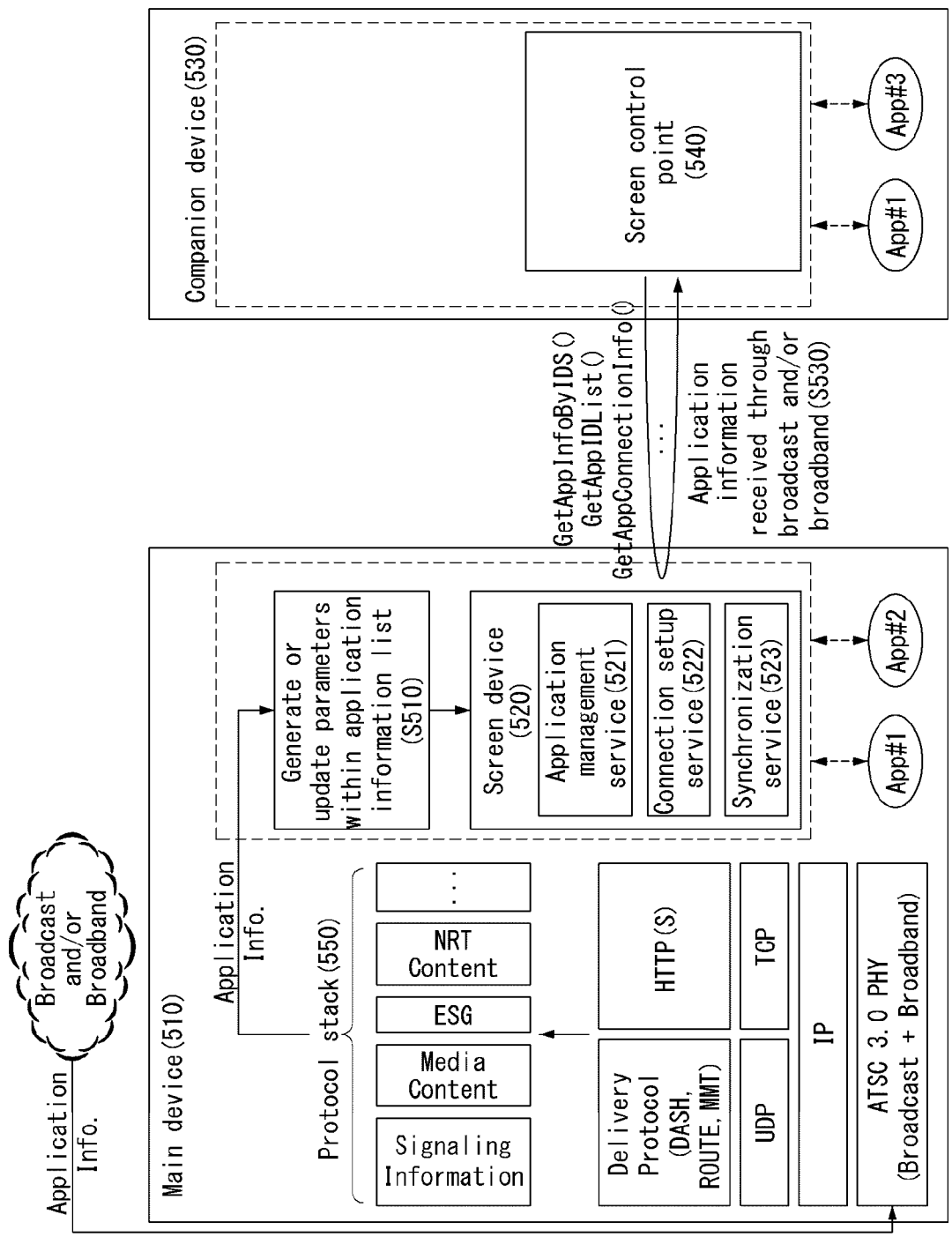
FIG. 5 is a block diagram illustrating a method for providing a multi-screen service using application information included in a broadcasting signal according to an embodiment to which the present invention may be applied.

FIG. 5 is a block diagram illustrating a method for providing a multi-screen service using application information included in a broadcasting signal according to an embodiment to which the present invention may be applied.

A main device 510 may receive a broadcasting signal, including application information, through an ATSC 3.0 physical layer.

The main device 510 may generate or update parameters within an application information list based on application information extracted through a protocol stack 550 (S510). In this case, the parameters within the application information list are described in more detail below in another embodiment of this specification.

The main device 510 may receive an application information-obtaining action, an application identifier list-obtaining action, or a connection information-obtaining action from the companion device 530 (S520). In this case, the application information-obtaining action, the application identifier list-obtaining action, or the connection information-obtaining action is described in more detail below in another embodiment of this specification.

The main device 510 may transmit the transmitted application information through broadcast and/or a broadband in response to the action (S530). In this case, the application information may be indicative of the parameters within the generated or updated application information list.

Figure 6:
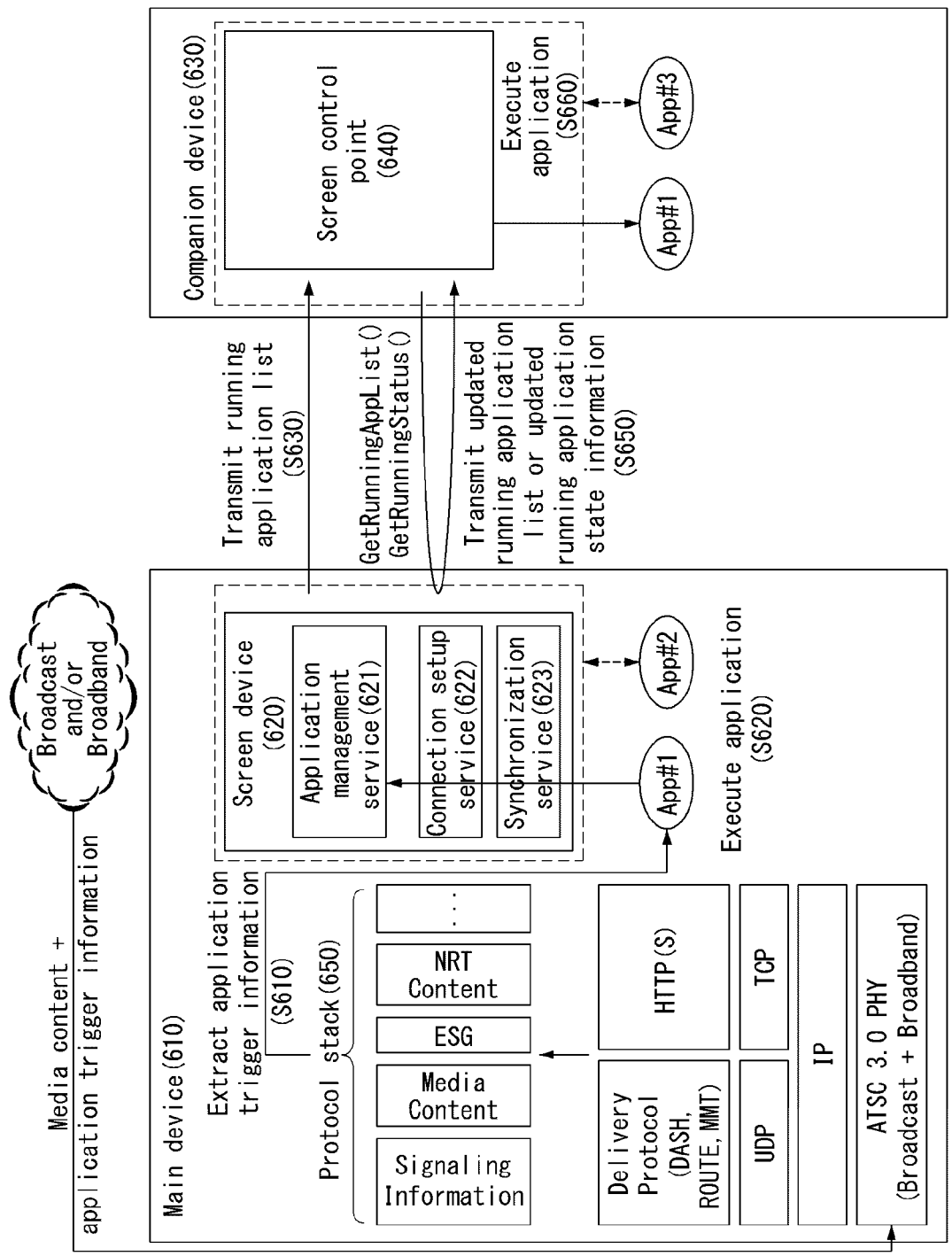
FIG. 6 is a block diagram illustrating a process for obtaining running application information using application trigger information included in a broadcasting signal according to an embodiment to which the present invention may be applied.

FIG. 6 is a block diagram illustrating a process for obtaining running application information using application trigger information included in a broadcasting signal according to an embodiment to which the present invention may be applied.

A main device 610 may receive a broadcasting signal, including media content and application trigger information, through broadcast and/or a broadband. The main device 610 may extract the application trigger information from the received broadcasting signal through a protocol stack 650 (S610).

The main device 610 may execute a first application App#1 based on the extracted application trigger information (S620). The main device 610 is a screen device 620, which may provide at least one of an application management service 621, a connection setup service 622, and a synchronization service 623.

For example, when the first application App#1 is running, the main device 610 may transmit an event message to a companion device 630, as the application management service 621 (S630). In this case, the event message may include running application list information.

The main device 610 may receive a running application list-obtaining action or a running application state information-obtaining action from the companion device 630 (S640). In this case, the companion device 630 operates as a screen control point 640. Furthermore, the running application list-obtaining action or the running an application state information-obtaining action is described in more detail below in another embodiment of this specification.

The main device 610 may transmit an updated running application list or updated running application state information in response to the action (S650).

When the updated running application list or the updated running application state information is received, the companion device 630 may execute a corresponding application App#1 (S660). In this case, the corresponding application App#1 is indicative of an application corresponding to the updated running application list or the updated running application state information.

Through such a process, the main device 610 and the companion device 630 can provide a multi-screen service.

Figure 7:
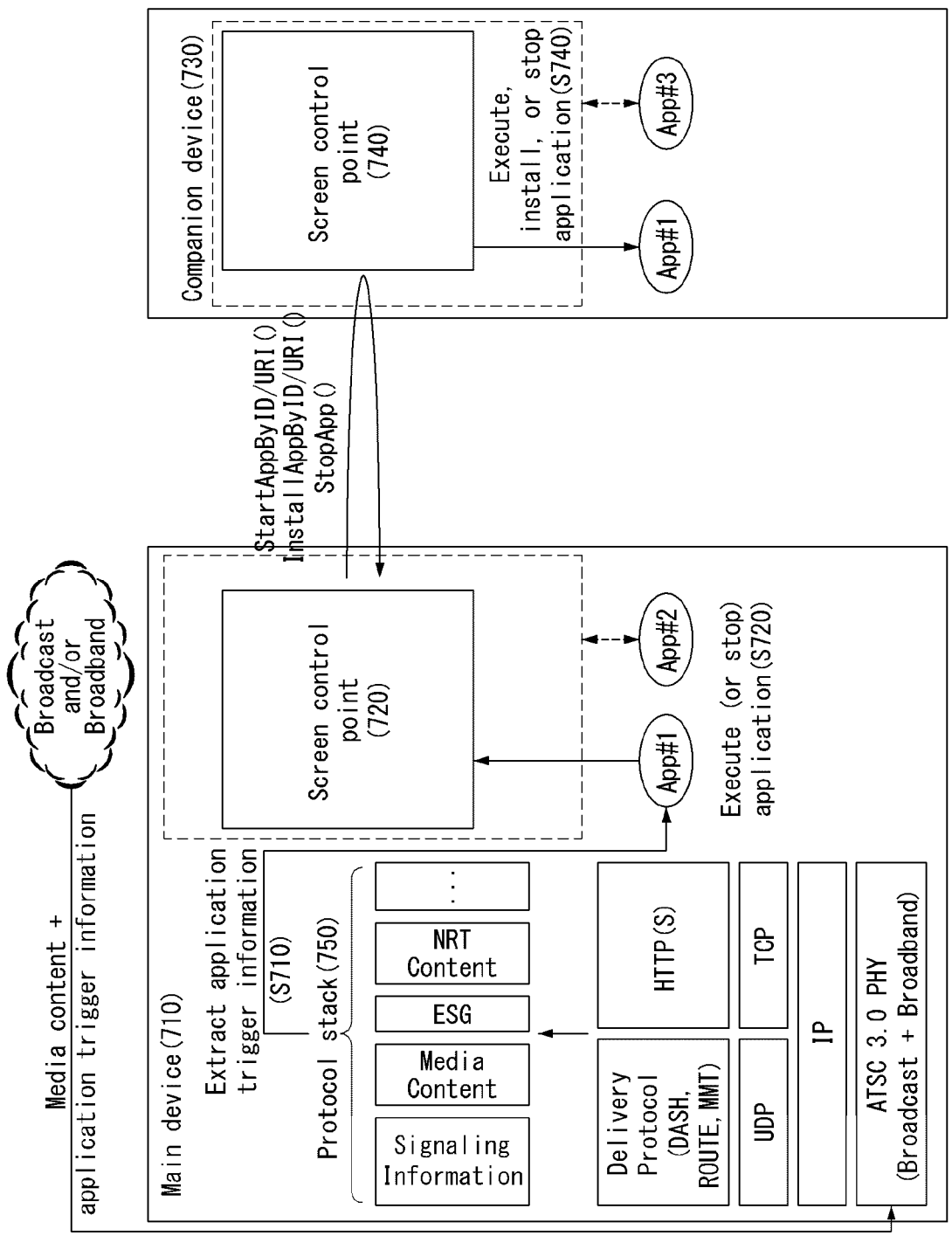
FIG. 7 is a block diagram illustrating a process for performing running, installation and/or stop control of an application of a companion device using application trigger information included in a broadcasting signal according to an embodiment to which the present invention may be applied.

FIG. 7 is a block diagram illustrating a process for performing running, installation and/or stop control of an application of a companion device using application trigger information included in a broadcasting signal according to an embodiment to which the present invention may be applied.

The embodiment of FIG. 7 is different from the embodiment of FIG. 6 in that a main device 710 operates as a screen control point 720 and a companion device 730 operates as a screen device 740 and that an action transmitted by the screen control point 720 is an application start action, an application installation action, or an application stop action.

That is, referring to FIG. 7, the main device 710 may extract application trigger information from a received broadcasting signal through a protocol stack 750 (S710).

The main device 710 may execute or stop a first application App#1 based on the extracted application trigger information (S720).

The main device 710 may transmit an application running action, an application installation action, or an application stop action to the companion device 730 (S730). In this case, the application running action, the application installation action, or the application stop action is described in more detail below in another embodiment of this specification.

In response to the action, the companion device 730 may execute, install, or stop the corresponding application App# I (S740).

Figure 8:
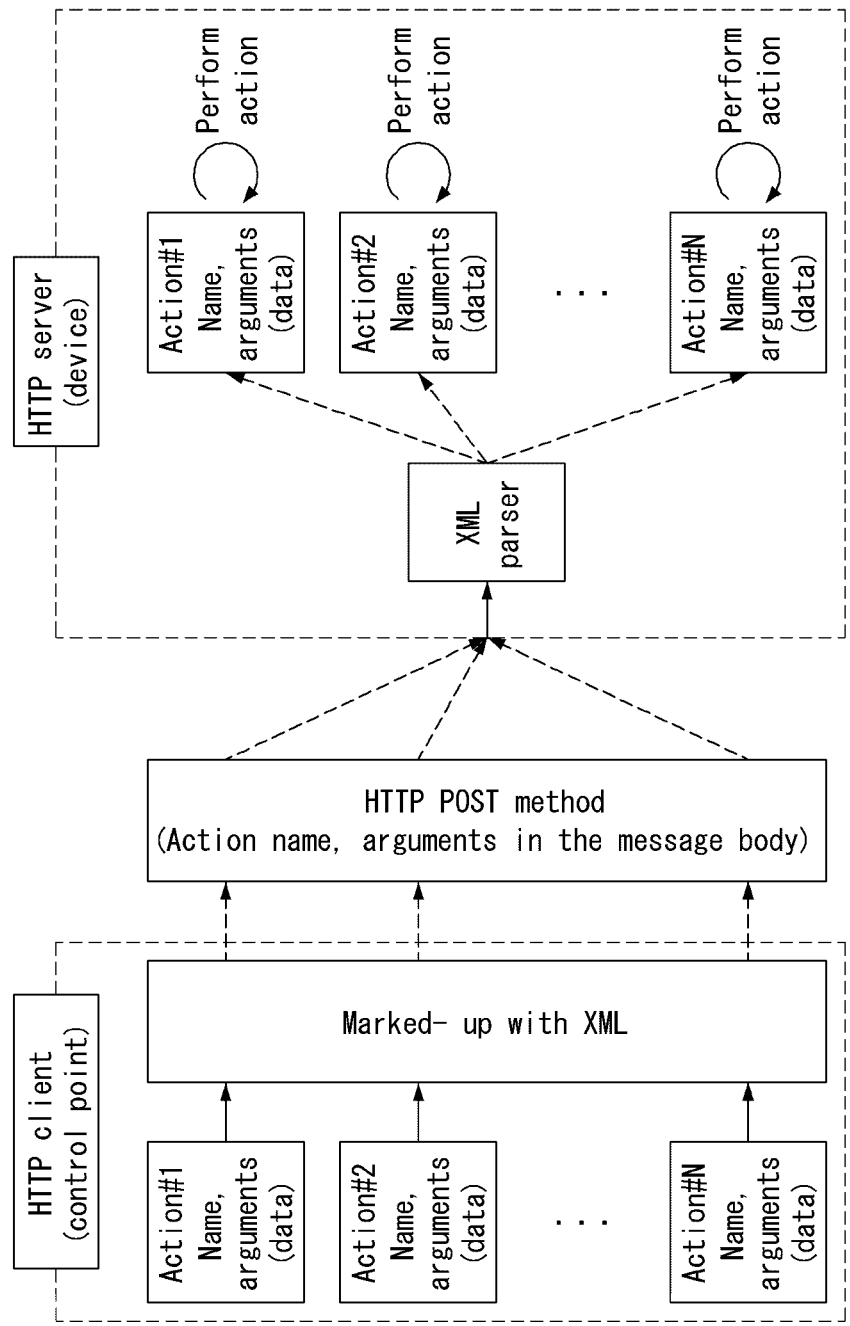
FIG. 8 is a block diagram illustrating a Universal Plug and Play (UPnP) mechanism according to an embodiment to which the present invention may be applied.

FIG. 8 is a block diagram illustrating a Universal Plug and Play (UPnP) mechanism according to an embodiment to which the present invention may be applied.

An UPnP action proposed according to an embodiment of the present invention is one of examples of various D2D communication methods, and is indicative of a control URL obtained in a UPnP discovery and description information transmission process. The UPnP action may deliver data to be actually delivered in an XML form through an HTTP POST message body using a POST method defined in HTTP. In the case of an UPnP protocol, an action name is defined in each action and used, and the action name is also delivered through an HTTP POST message body delivered in an XML form. Accordingly, unlimited types of actions (or messages) can be exchanged although there is only one URL for a target device and only one HTTP POST method is used.

Figure 9:
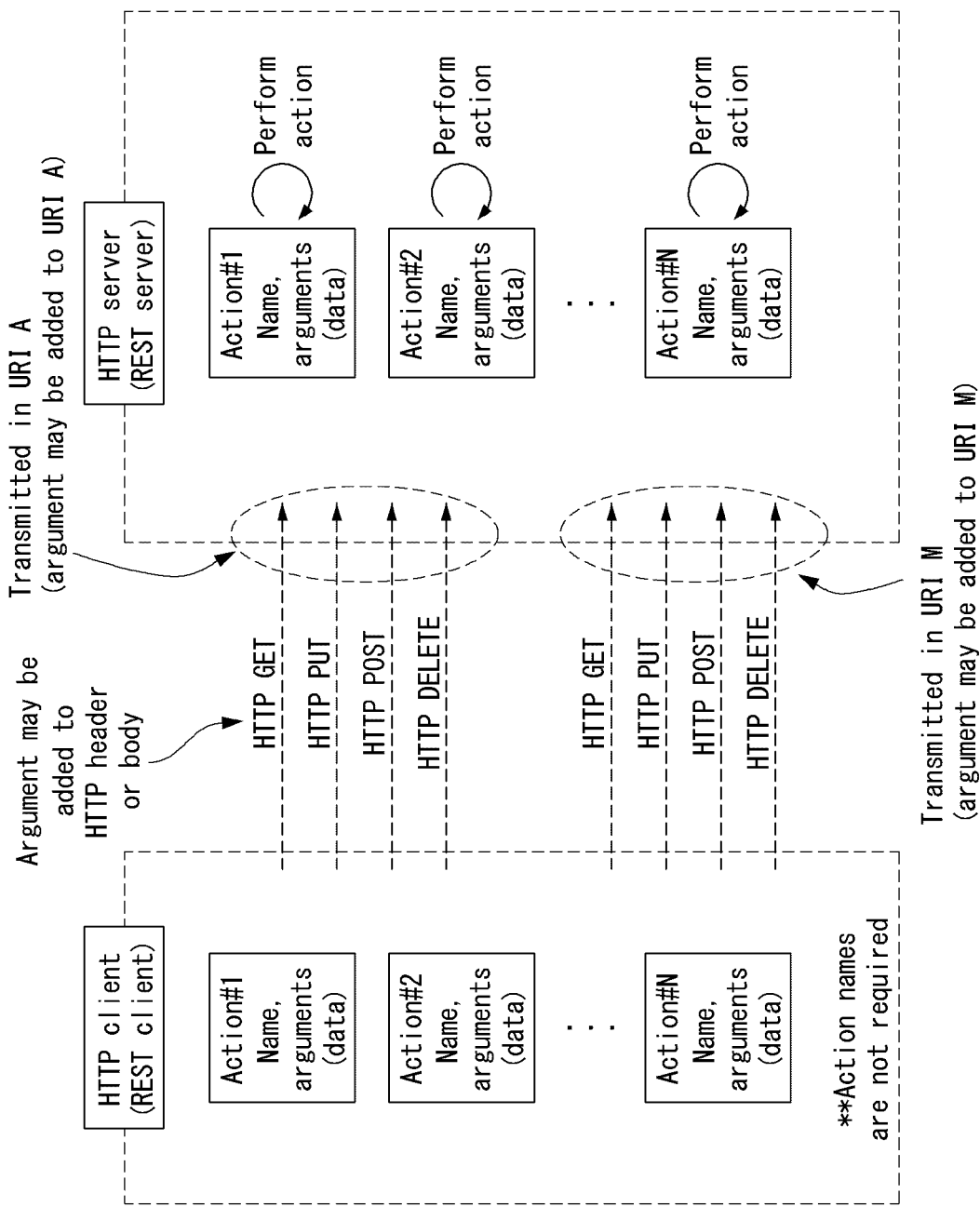
FIG. 9 is a block diagram illustrating a REpresentational State Transfer (REST) mechanism according to an embodiment to which the present invention may be applied.

FIG. 9 is a block diagram illustrating a REpresentational State Transfer (REST) mechanism according to an embodiment to which the present invention may be applied.

For example, D2D communication proposed according to an embodiment of the present invention may be applied even without defining an action name if several methods, such as GET, HEAD, PUT, DELETE, TRACE, OPTIONS, CONNECT, and PATCH, are used in addition to POST of HTTP methods and a plurality of URIs from which a target device will be accessed. Data to be delivered may be added to a corresponding URI and delivered or may be included in an HTTP body in various forms and delivered. However, a plurality of URI values for such an REST method may be obtained in a discovery and description information transmission process.

Figure 10:
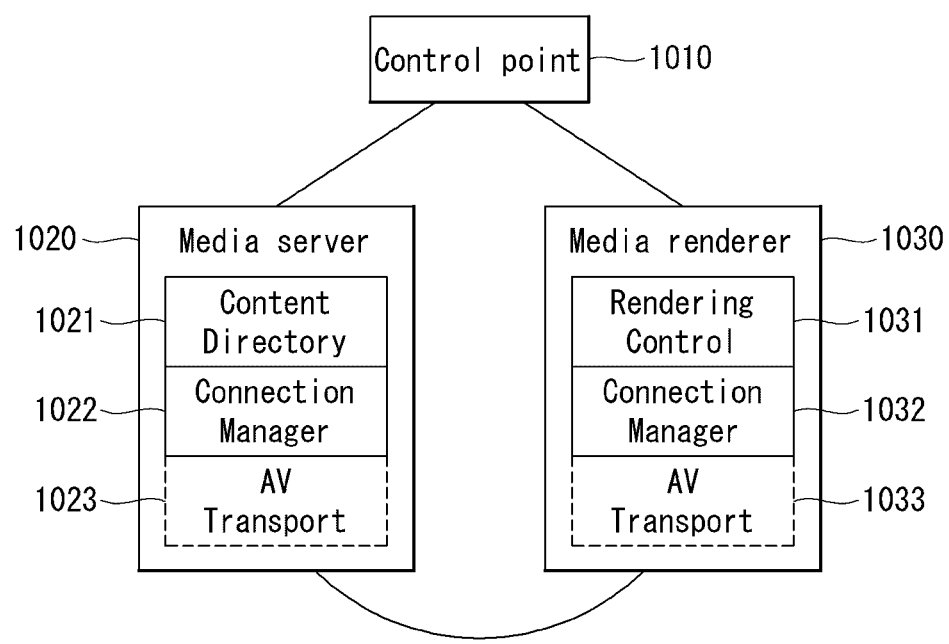
FIG. 10 shows a schematic configuration of a Universal Plug and Play (UPnP) Audio-Visual (AV) network according to an embodiment to which the present invention may be applied.

FIG. 10 shows a schematic configuration of a Universal Plug and Play (UPnP) Audio-Visual (AV) network according to an embodiment to which the present invention may be applied.

As shown in FIG. 10, the UPnP-based AV network may be configured to include a Media Server (MS) 1020 for providing media data to a network, a Media Renderer (MR) 1030 for playing back media data over a network, and a Control Point (CP) 1010 for controlling the MS 1020 and the MR 1030. The MS 1020 and the MR 1030 are controlled devices controlled by the CP 1010.

The MS 1020 may include a Content Directory Service (CDS) 1021, a connection manager service 1022, and an AV transport service 1023.

In order to notify the CP 1010 of directory information, the MS 120 may notify the CP 1010 of information about a media file using its own file system whenever an UPnP action, for example, a browsing action is present. Furthermore, the data of a media file selected through the user interface of the CP 1010 may be transmitted using a streaming method between the MS 1020 and the MR 1030 and played back through the MR 1030.

In this case, any one of known various methods may be used as the streaming method. For example, an out-of-band transfer protocol may be used as the streaming method. For detailed example, if a Real-time Transport Protocol (RTP) is used for media transfer, the transfer status of media data may be monitored using a Real Time Control Protocol (RTCP), and a transfer parameter may be controlled based on the transfer state.

The CP 1010 may control the MS 1020 and the MR 1030 and may be performed by fetching an UPnP action provided based on a Standardized Simple Object Access Protocol (SOAP), for example. Furthermore, the CP 1010 may subscribe to an event service provided by a device and receive a report regarding a change in the status information of the device.

The MS 1020 may include the CDS service 1021 for providing a service that discovers media data managed by the CDS unit, the connection manager service 1022 for managing a connection with another device, that is, the MR 1030, and the AV transport service 1023 for enabling control of the playback of media, for example, control, such as play and stop.

The MR 1030 may include a rendering control service 1031 for enabling control of the brightness and luminosity of a screen when media is presented, a connection manager service 1032 for managing a connection with another device, and an AV transport service 1033.

The CP 1010 may check media file information within a server using the content directory service 1021 of the MS 1020. When a user selects a specific media file based on the media file information, the CP 1010 may set up a connection for media transport between the MS 1020 and the MR 1030 through the connection manager services 1022 and 1032 of respective devices. Furthermore, the CP 1010 may configure variables for control of the playback of a corresponding media file using the AV transport service 1023 or 1033, and may request a playback action from the MS (in the case of push mode) or the MR (in the case of pull mode) so that the media file is played back. During the playback, the CP 1010 may control the brightness or luminosity of a screen or the volume through the rendering control service 1031 of the MR 1030.

Furthermore, the CP 1010 may subscribe to an event provided by each service and monitor information about a change in the content of the MS 1020 or a change in the status of a current media stream.

Accordingly, a user may request media to be played back in a plurality of devices, that is, a plurality of renderers, through a home network, or may move to another place while watching media through a single renderer and continue to watch the media at the place through the renderer.

Figure 11:
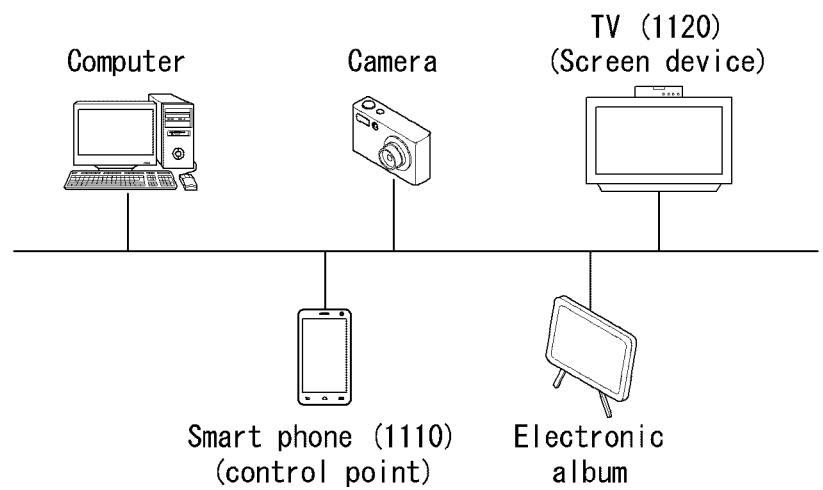
FIG. 11 shows an example of a Universal Plug and Play (UPnP) Audio-Visual (AV) network to which a multi-screen service is applied according to an embodiment to which the present invention may be applied.

FIG. 11 shows an example of a Universal Plug and Play (UPnP) Audio-Visual (AV) network to which a multi-screen service is applied according to an embodiment to which the present invention may be applied.

A network providing a multi-screen service to which an embodiment of the present invention is applied may be connected to various devices. For example, a multi-screen service may be provided if electronic devices capable of an interactive service, such as a computer, a camera, a printer, and an electronic album, in addition to a smart phone 1110 and TV 1120 are connected, as shown in FIG. 11.

In this case, the multi-screen service may mean a time-sensitive and interactive service provided between various display devices. For example, the multi-screen service may include an implementation-specific application.

Figure 12:
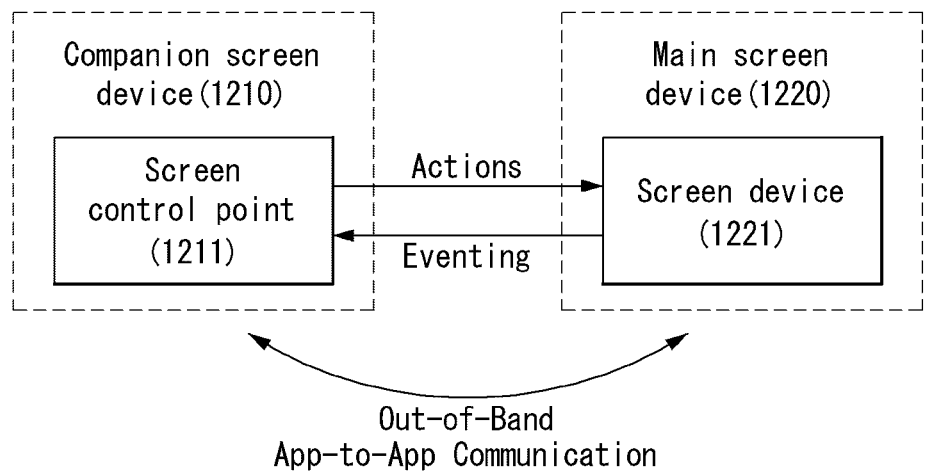
Figure 13:
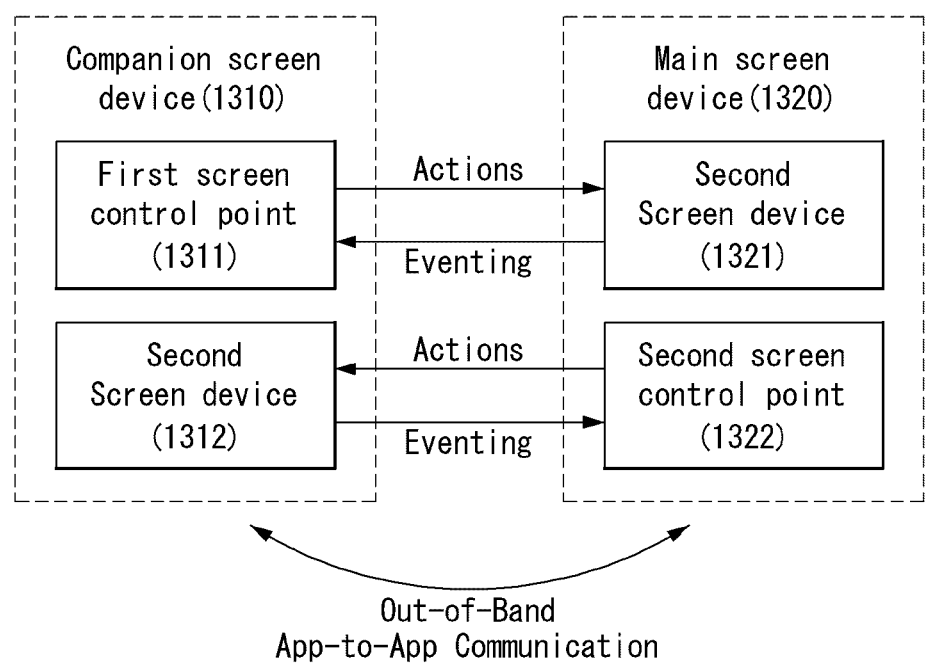

FIGS. 12 and 13 are embodiments to which the present invention may be applied. FIG. 12 shows basic architecture to which a multi-screen service is applied, and FIG. 13 shows architecture to which an extended multi-screen service is applied.

It is assumed that various devices are connected to a network providing a multi-screen service. The devices connected over the network may be categorized into a main screen device and a companion screen device depending on the role of a specific application and/or a method of using the specific application.

First, the main screen device is indicative of a device controlled by a companion screen device. For example, the main screen device may include a lean-back display device, such as TV or a set-top box. Furthermore, any display device may become a main screen device depending on a use scenario. For example, a device, such as a smart phone or a tablet, may become a main screen device.

The companion screen device is indicative of a device controlling the main screen device. For example, the companion screen device may include a lean-forward display device or a handheld display device, such as a smart phone or a tablet. Furthermore, any display device may become a companion screen device depending on a use scenario. For example, a device, such as TV or a set-top box, may become a companion screen device.

FIG. 12 shows architecture for providing an interactive service based on two of various devices connected over a network, for example, a companion screen device 1210 and a main screen device 1220. In this case, the companion screen device 1210 may operate a screen control point 1211, and the main screen device 1220 may operate as a screen device 1221. For example, referring to FIG. 12, the companion screen device 1210 may transmit actions for controlling the main screen device 1220. The main screen device 1220 may transmit an event message to the companion screen device 1210 or transmit a response message for the actions to the companion screen device 1210. In this case, the companion screen device 1210 operates as the screen control point 1211, and the main screen device 1220 operates as the screen device 1212.

Furthermore, an embodiment of the present invention can provide an extended multi-screen service. In this case, the extended multi-screen service may mean a service that requires more sophisticated interactions.

FIG. 13 shows architecture for providing an extended multi-screen service based on two devices connected over a network, for example, a companion screen device 1310 and a main screen device 1320.

For example, referring to FIG. 13, an operation between a first screen control point 1311 and a first screen device 1312 is the same as that described with reference to FIG. 12. Furthermore, the main screen device 1320 may transmit actions for controlling the companion screen device 1310. The companion screen device 1310 may transmit an event message to the main screen device 1320 or transmit a response message for the actions to the main screen device 1320. In this case, the main screen device 1320 operates as the second screen control point 1311, and the companion screen device 1310 operates as the second screen device 1312.

That is, the companion screen device 1310 may operate as the first screen control point 1311 and operate as the second screen device 1312 in accordance with the main screen device 1320. Furthermore, the main screen device 1320 may operate as a first screen device 1321 or operate as a second screen control point 1322 in accordance with the companion screen device 1310.

A screen device may mean a component which is performed along with a screen control point and which is used to provide various interactive services to another display device. The screen device may be designed to be controlled by the screen control point and to operate in conjunction with the screen control point.

In order to support a multi-screen service, it is recommenced that a screen device operates as a main screen device (e.g., a lean-back display device, such as TV or a set-top box) controlled by a companion screen device.

Furthermore, in order to support an extended multi-screen service, it is recommenced that a screen device operates as a companion screen device (e.g., a lean-forward display device or handheld display device, such as a smart phone or a tablet) that controls a main screen device.

Furthermore, a screen control point is indicative of a component which is performed along with a screen device and which is used to provide various interactive services to another display device. The screen control point may be designed to control the screen device in response to a user input and to operate in conjunction with the screen device.

In order to support a multi-screen service, it is recommended that a screen control point operates as a companion screen device (e.g., a lean-forward display device or handheld display device, such as a smart phone or a tablet) that controls a main screen device.

Furthermore, in order to support an extended multi-screen service, it is recommended that a screen control point operates as a main screen device (e.g., a lean-back display device, such as TV or a set-top box) controlled by a companion screen device.

For example, referring to FIG. 13, both the main screen device 1320 and the companion screen device 1310 may operate as screen devices and also operate as screen control points.

In order to interoperate a new type of service between devices connected over a network, an embodiment of the present invention provides a method and apparatus for providing an interactive service in an application form without a separate protocol. More specifically, there are provided a method and apparatus for managing an application in a network providing a multi-screen service.

For example, if a user wants to use an interactive service X through devices A and B connected over a network, an implementation may be possible so that the interactive service X is always running in the devices A and B. Alternatively, the user may conveniently use the interactive service X if a device notifies the user whether a specific application needs to be installed and/or executed without a need for the user to directly search for an application for the interactive service X in the devices A and B and to install or execute the application.

For another example, devices A and B may have or may not have the same application. If the devices A and B have the same application, the devices A and B may provide an interactive service through application execution. If the devices A and B do not have the same application, an interactive service may be provided by checking that a device requires what application and downloading and/or executing the application.

Furthermore, in an embodiment of the present invention, user convenience can be improved in such a manner that management, such as the installation, running, stopping running, and uninstallation, for an application of the other device is made possible through one device.

Furthermore, in an embodiment of the present invention, a message including an ID and a password may be transmitted so that only a permitted specific user or device may use the interactive service X.

Furthermore, an embodiment of the present invention provides a method for performing a connection between applications installed in a device. For example, if applications capable of an interaction have been installed in devices A and B, the two devices A and B may share information for an interaction, and the applications may directly communicate with each other by sharing the information.

Furthermore, one device, together with the other device, may form a plurality of connections. In this case, the other device may be one device or a plurality of devices. The device may support the plurality of connections at the same time and control the plurality of connections. Furthermore, information about a specific one of the plurality of connections or information about all the connections may be transmitted so that another device is aware of the information.

In an embodiment of the present invention, only a permitted specific user or specific device may be permitted to perform an embodiment described in this specification. To this end, an ID and a password may be included in a message, and the message may be transmitted.

In an embodiment of the present invention, a user may subscribe to an application management service so as to use an interactive service between devices connected over a network. Furthermore, a user's rights to use an application management service may be permitted or limited through a separate right setting process.

In an embodiment of the present invention, a synchronization process between devices may be required in order to use a time-sensitive interactive service between devices connected over a network. For example, a synchronization mechanism, such as basic clock synchronization and content synchronization, may be required.

In an embodiment of the present invention, a device supporting an application management service, a connection establishment service, and a synchronization service may be discovered in a network through a discovery mechanism. Furthermore, devices may exchange additional information about each service through a description mechanism.

Hereinafter, embodiments are described in detail with reference to the accompanying drawings. Redundant contents in various embodiments may be omitted, and a detailed description of terms used in this specification or embodiments may be applied to other embodiments.

Figure 14:
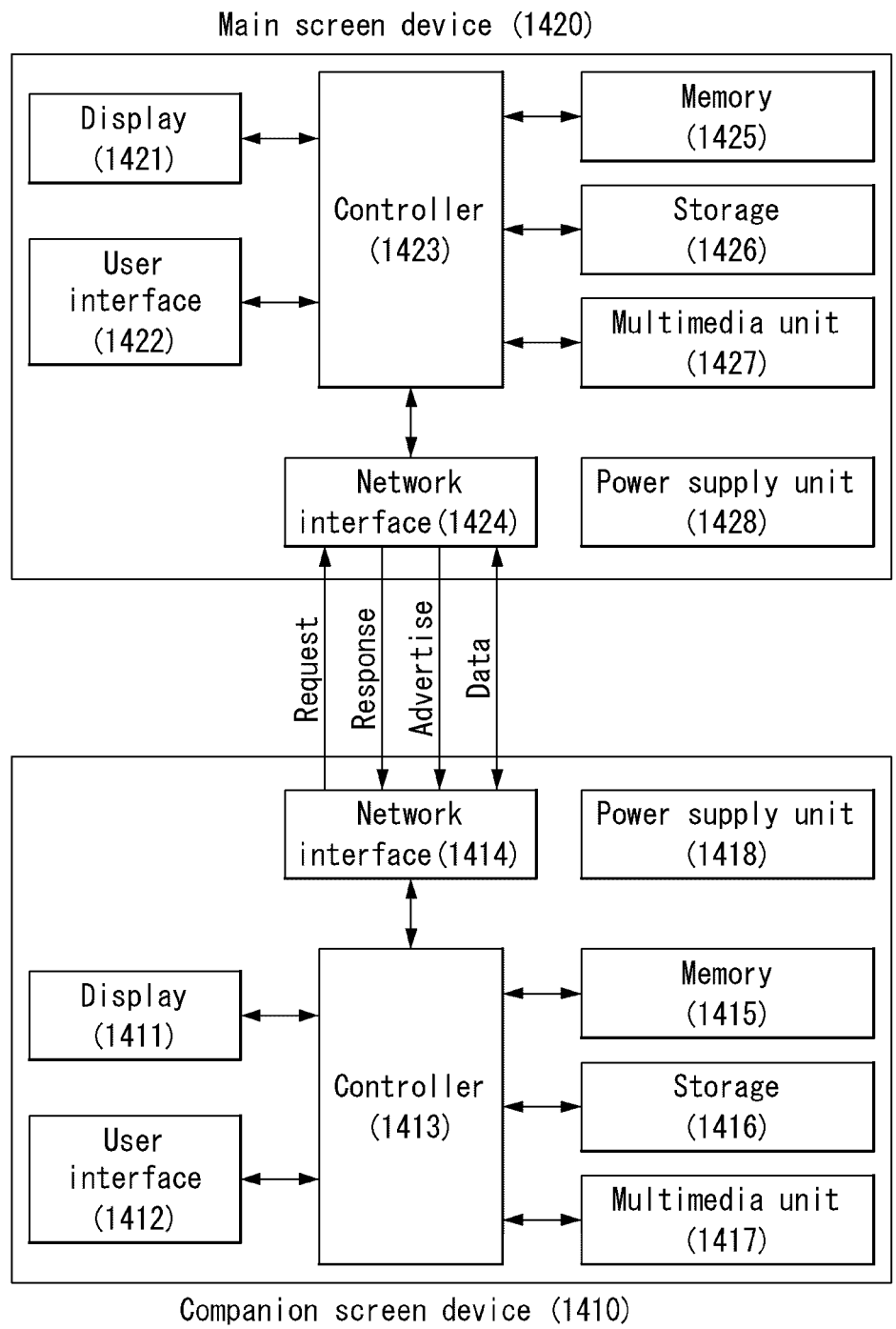
FIG. 14 shows a schematic configuration of a device to which a multi-screen service is applied according to an embodiment to which the present invention may be applied.

FIG. 14 shows a schematic configuration of a device to which a multi-screen service is applied according to an embodiment to which the present invention may be applied.

FIG. 14 is an internal block diagram of a companion screen device 1410 and a main screen device 1420 providing an extended multi-screen service.

The companion screen device 1410 may include a display 1411, a user interface 1412, a controller 1413, a network interface 1414, memory 1415, storage 1416, a multimedia unit 1417, and a power supply unit 1418.

The display 1411 displays data received through the network interface 1414 or data stored in the storage 1416 on a screen under the control of the controller 1413.

The user interface 1412 plays the role of a passage that provides information to a user by transmitting a signal from the user to the controller 1413 and outputting a signal controlled by the controller 1413 through the display 1411.

The controller 1413 functions to control an overall operation of the companion screen device 1410. Various embodiments described in this specification may be performed through the controller 1413.

The network interface 1414 may receive a message, including at least one of a command, a request, an action, a response, an event message, an advertising message, and data, from an external device or may transmit such a message to an external device. Furthermore, the network interface 1414 may be a physical component of the companion screen device 1410.

The memory 14114 is an optional device implemented in various types of devices and may temporarily store various types of data. For example, the memory 1415 may be a volatile type of a physical device.

The storage 1416 may store various types of information. For example, the storage 1416 may be a nonvolatile type of a physical device, such as an SD card. The storage 1416 may include a content storage unit (not shown), a metadata storage unit (not shown), and a buffer (not shown). The content storage unit (not shown) may store media content data. The metadata storage unit (not shown) may store metadata indicative of additional information about content. The metadata storage unit (not shown) may sort and store metadata. The buffer (not shown) may temporarily store various types of data.

The multimedia unit 1417 is a device for various types of multimedia playback, and may play back stored content or content received from the outside. The multimedia unit 1417 may be implemented in the controller 1413 or may be implemented separately from the controller 1413.

The power supply unit 1418 is supplied with external power or internal power, and it supplies power for the operations of the elements under the control of the controller 1413.

Furthermore, the main screen device 1420 may include a display 1421, a user interface 1422, a controller 1423, a network interface 1424, memory 1425, storage 1426, a multimedia unit 1427, and a power supply unit 1428. The elements of the main screen device 1420 may perform the same or similar functions as the elements of the companion screen device 1410, and a detailed description thereof is omitted.

Figure 15:
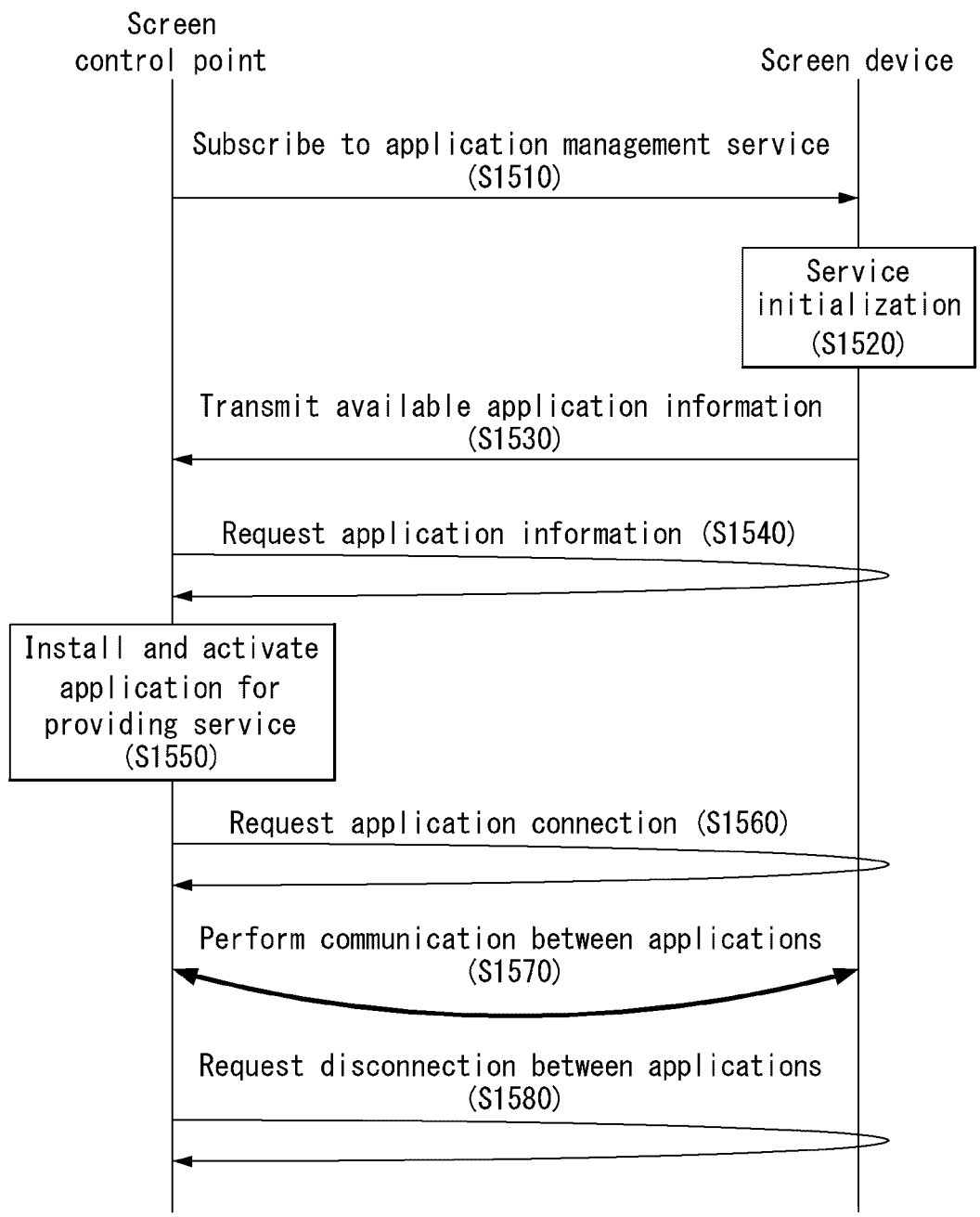
FIG. 15 is a flowchart illustrating an interaction between devices when a multi-screen service is initiated by a screen device according to an embodiment to which the present invention may be applied.

FIG. 15 is a flowchart illustrating an interaction between devices when a multi-screen service is initiated by a screen device according to an embodiment to which the present invention may be applied.

A screen control point may subscribe to an application management service in order to provide a multi-screen service (S1510).

If a screen device checks that the screen control point has subscribed to the application management service, it may perform service initialization (S1520).

After the service initialization, the screen device may transmit available application information (S1530). In this case, the available application information may be transmitted as an event message directly by the screen device or may be transmitted as a response message for a request from the screen control point. In this case, such a process may not be essential for an apptoapp connection.

The screen control point may request specific application information from the screen device (S1540). The screen device may transmit the specific application information to the screen control point in response to the request (S1540). In this case, the specific application information may be the entire application information or information about a designated application.

The screen control point may receive the specific application information, may install an application for providing the multi-screen service based on the received specific application information, and may execute the application (S1550).

When the application is executed, the screen control point may request a connection between applications from the screen device (S1560). In this case, an apptoapp connection (i.e., a connection between applications) action may be used. The screen device may transmit a connection identifier to the screen control point in response to the request (S1560).

When the connection between applications is established through such a process, the screen control point and the screen device may perform communication through the applications (S1570).

Thereafter, if additional communication is not required, the screen control point may request a disconnection between the applications from the screen device (S1580). In this case, an application disconnection action "DisconnectApptoApp( )" may be used. The screen device may transmit disconnection information to the screen control point in response to the request (S1580).

Figure 16:
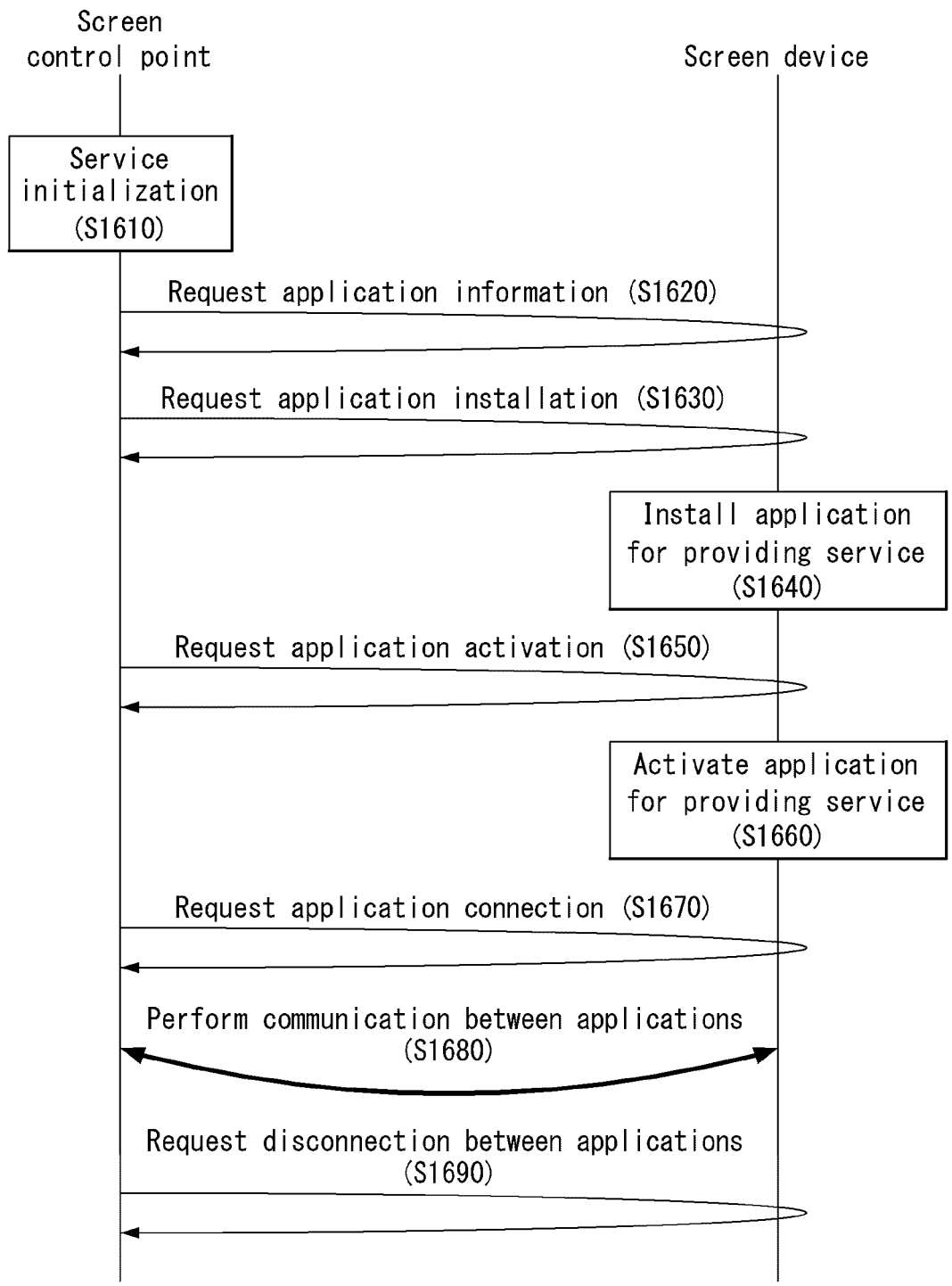
FIG. 16 is a flowchart illustrating an interaction between devices when a multi-screen service is initiated by a controller according to an embodiment to which the present invention may be applied.

FIG. 16 is a flowchart illustrating an interaction between devices when a multi-screen service is initiated by a controller according to an embodiment to which the present invention may be applied.

A screen control point may perform service initialization in order to provide a multi-screen service (S1610).

After the service initialization, the screen control point may request application information from a screen device (S1620). In this case, an application information request action may be used. The screen device may transmit the application information to the screen control point in response to the request (S1620).

The screen control point may request application installation from the screen device (S1630). In this case, an application installation action may be used. The application installation action may be performed based on an application identifier or a Uniform Resource Identifier (URI).

The screen device may install an application for providing the multi-screen service in response to the application installation request (S1640).

Furthermore, the screen control point may request application activation from the screen device (S1650). In this case, an application activation action may be used. The application activation action may include the identifier of an application to be activated. The screen device may execute the application in response to the request (S1660).

When the application is executed as described above, the screen control point may request an apptoapp connection from the screen device (S1670). In this case, an apptoapp connection action may be used. The screen device may transmit a connection identifier to the screen control point in response to the request (S1670).

When the connection between applications is established through such a process, the screen control point and the screen device may perform communication through the applications (S1680).

Thereafter, if additional communication is not required, the screen control point may request a disconnection between the applications from the screen device (S1690). In this case, an application disconnection action may be used. The screen device may transmit disconnection information to the screen control point in response to the request (S1690).

Figure 17:
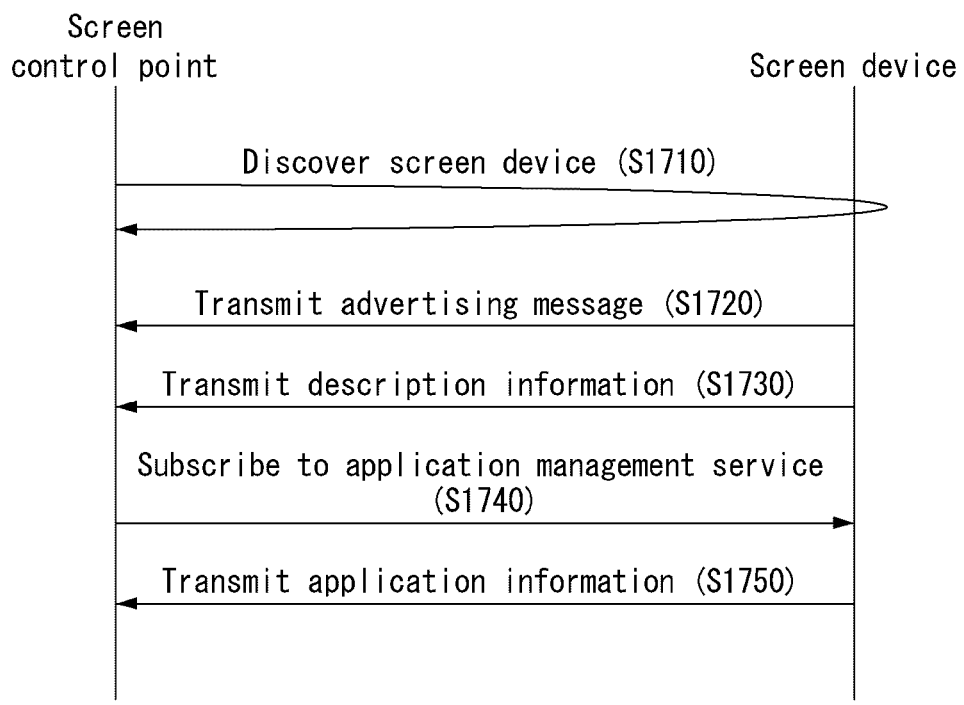
FIG. 17 is a flowchart illustrating an interaction for managing an application connection between devices according to an embodiment to which the present invention may be applied.

FIG. 17 is a flowchart illustrating an interaction for managing an application connection between devices according to an embodiment to which the present invention may be applied.

A screen control point may discover a screen device in order to provide a multi-screen service (S1710). In this case, a discovery action may be used. If, as a result of the discovery, the screen device is discovered, the discovered screen device may transmit a response message for the discovery action. For example, the screen device may advertise that it is the screen device, and may advertise an address from which device description document including its own information may be accessed (S1720).

Furthermore, the screen device may transmit description information to the screen control point (S1730). For example, the description information may include basic device information, information regarding that it is what type of device (e.g., a screen device or a screen control point), and information about a service that may be provided by a device itself (e.g., an application management service or an application connection service).

The screen control point may subscribe to an application management service in order to provide the multi-screen service (S1740). If an event message from the screen device does not need to be received, the screen control point may not subscribe to the application management service. In this case, the screen control point may periodically check information related to the screen device.

The screen device may transmit application information to the screen control point (S1750). In this case, the application information may be the entire application information of the screen device or information about a designated application.

Figure 18:
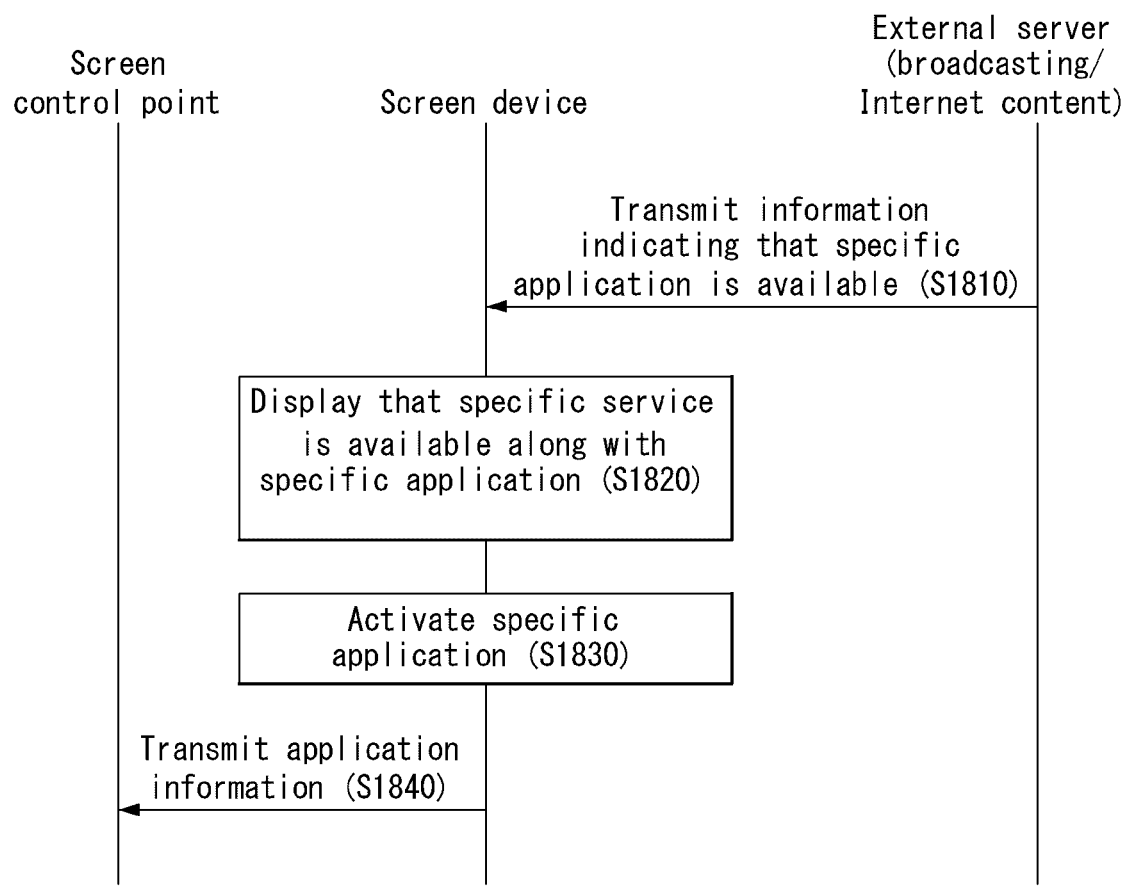
FIG. 18 is a flowchart illustrating a process for controlling an application which is used along with content if the content is provided by an external server according to an embodiment to which the present invention may be applied.

FIG. 18 is a flowchart illustrating a process for controlling an application which is used along with content if the content is provided by an external server according to an embodiment to which the present invention may be applied.

A screen device may receive content from an external server. Furthermore, the screen device may require a specific application in order to use the content. In this case, the content may be broadcasting content or may be content downloadable from the Internet.

The screen device may receive information related to an available specific application from the external server (S1810).

When the screen device receives the information, it may display that a specific service is available along with the specific application (S1820). Furthermore, the screen device may activate the specific application (S1830). The activation may be automatically performed by the screen device or may be performed in response to a user input.

The screen device may transmit information related to the specific application to the screen control point in order to provide a multi-screen service (S1840).

Figure 19:
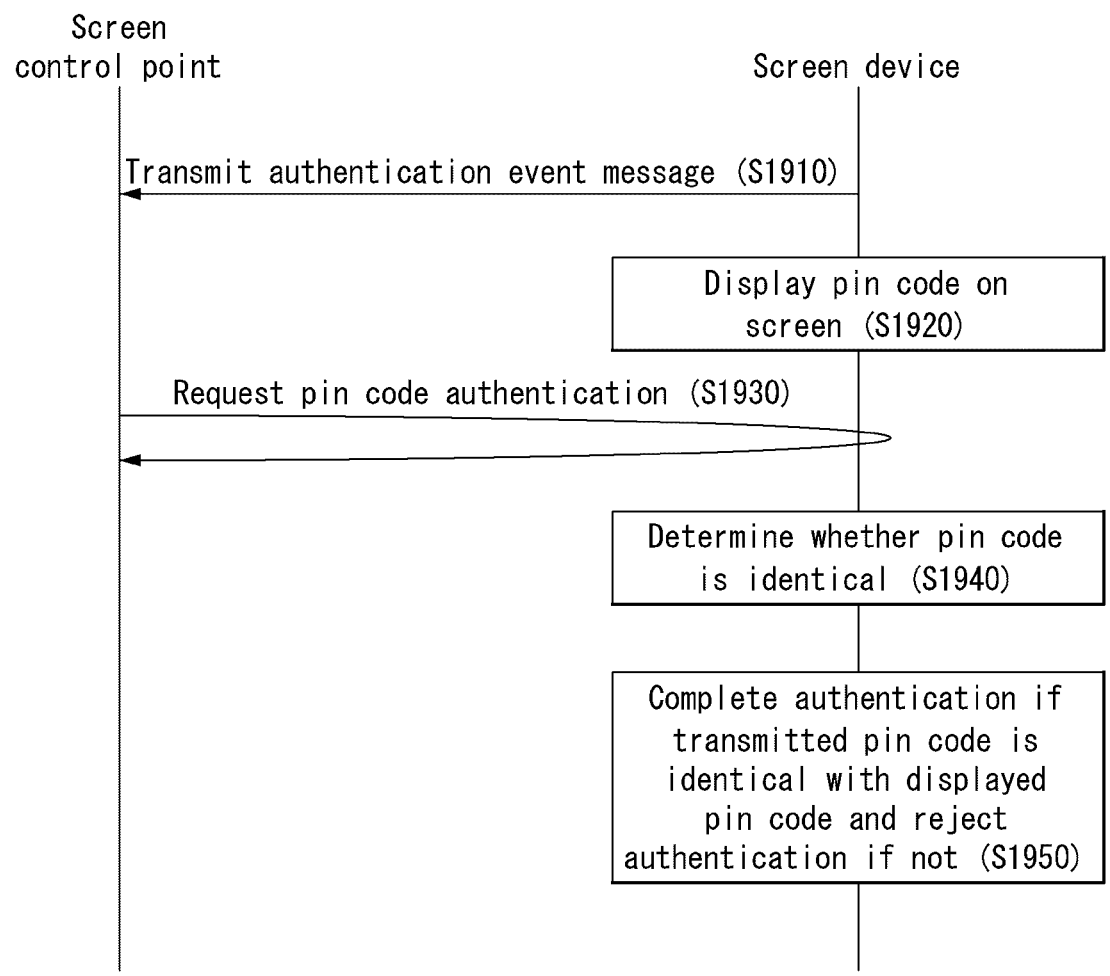
FIG. 19 is a flowchart illustrating an authentication process necessary for an application connection between devices according to an embodiment to which the present invention may be applied.

FIG. 19 is a flowchart illustrating an authentication process necessary for an application connection between devices according to an embodiment to which the present invention may be applied.

A screen device may transmit an event message to only a screen control point that needs to be authenticated (S1910). For example, if a screen control point that requires authentication is present, the screen device changes an authentication variable value and transmits the changed value to the screen control point. In this case, the authentication variable value may be displayed on a screen (S1920).

When the screen control point receives the event message, it may recognize that it requires authentication. Furthermore, the screen control point may request pin-code authentication from the screen device. In this case, the request may be performed by a pin-code authentication action. The pin-code authentication action is used to authenticate an action transmission device or to authenticate the user of an action transmission device.

When the screen device receives the pin-code authentication action, it may check whether the received pin code is the same as the pin code of the screen device (S1940).

If, as a result of the check, the pin code transmitted by the action transmission device is found to be the same as the pin code of the screen device, the action transmission device may be authenticated. If not, the authentication of the action transmission device will be rejected (S1950).

Authentication information, such as the pin code, may be valid for only a limited time. For example, if a service subscription expires or a service subscription has not been performed, the screen control point may experience an authentication procedure again when subscribing to a service.

Figure 20:
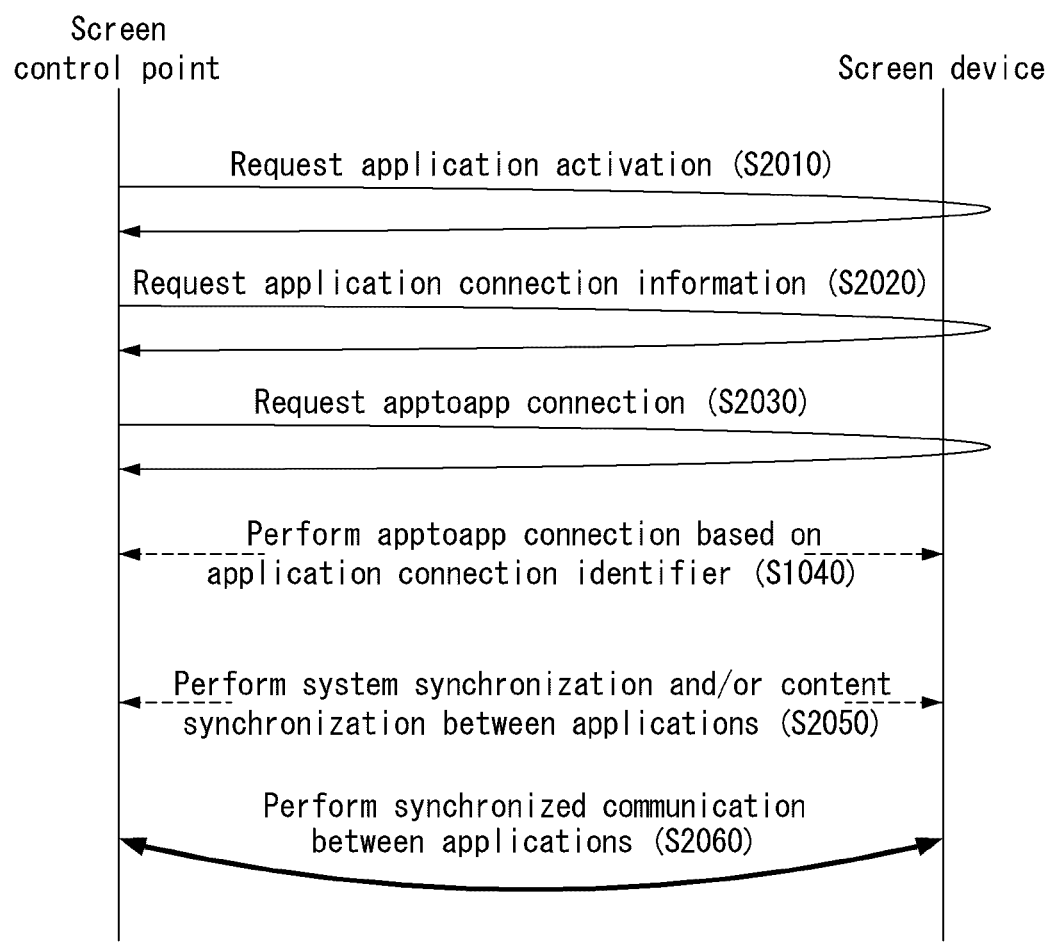
FIG. 20 is a flowchart illustrating a process for performing synchronized communication through an application connection between devices according to an embodiment to which the present invention may be applied.

FIG. 20 is a flowchart illustrating a process for performing synchronized communication through an application connection between devices according to an embodiment to which the present invention may be applied.

A screen control point may request application activation from a screen device (S2010). In this case, an application activation action may be used. The application activation action may include the identifier of an application to be activated. The screen device may execute the application in response to the request.

When the application is executed as described above, the screen control point may request application connection information from the screen device (S2020). In this case, a connection information-obtaining action may be used. The screen device may transmit connection information to the screen control point in response to the request. In this case, the connection information may include a specific portion of an application information list. The connection information may be indicative of information between applications "apptoappinfo." For example, the information between applications "apptoappinfo" may include at least one of specific protocol name information, transport protocol information, and connection address information. In this case, the connection address information may mean access information for communication between applications.

The screen control point may request an apptoapp connection from the screen device based on the connection information (S2030). In this case, an apptoapp connection action may be used. The screen device may transmit a connection identifier to the screen control point in response to the request.

When the apptoapp connection is established through such a process (S2040), the screen control point and the screen device may perform system synchronization and/or content synchronization between applications (S2050).

Furthermore, the screen control point and the screen device may perform synchronized communication through the applications (S2060).

FIGS. 21 to 37 illustrate actions for application management and arguments thereof according to embodiments to which the present invention may be applied.

Action names shown in FIGS. 21 to 37 are only an embodiment, and the present invention should not be construed as being limited to the action names, but should be construed as meanings described in this specification. Furthermore, in the directions of an argument, "IN" may be construed as being input information and "OUT" may be construed as being output information.

FIG. 21 shows a first application information-obtaining action and arguments thereof according to an embodiment to which the present invention may be applied.

The first application information-obtaining action 2100 may enable a screen control point to obtain application information specified by an application identifier. Furthermore, the name of the first application information-obtaining action may be indicated as SearchAppInfo( ) or GetAppInfo ( ).

The arguments of the first application information-obtaining action may include at least one of an application identifier 2110, reference information 2120, device profile information 2130, filter information 2140, and application information 2150.

In this case, the application identifier 2110 is indicative of information to identify an application from which information is to be obtained. For example, when a specific value "XYZ" is inputted, the application identifier 2110 may be indicative of an application identified by the specific value "XYZ." When a specific value "*" or "(empty string)" is inputted, the application identifier 2110 may mean all the applications of an application information list.

The reference information 2120 is indicative of information to determine the status of an application. For example, the reference information 2120 may be used to determine whether information is information related to an available application, information related to an activation application, or information related to a specific application.

The device profile information 2130 is indicative of information about the profile of a corresponding device. For example, if the device profile information is indicative of resolution "1920x1080," application information satisfying the resolution may be obtained.

The filter information 2140 is indicative of information which is used to obtain application information satisfying a specific condition.

The application information 2150 is indicative of information about the type of arguments within various actions. For example, the application information 2150 may be a specific portion of an application information list variable.

The application information list variable is described in detail later with reference to FIG. 38.

The embodiment of FIG. 21 may be performed by the elements of FIG. 14. For example, the controller 1413 of the first screen device 1410 may transmit the first application information-obtaining action to the second screen device 1420 through the network interface 1414.

The controller 1423 of the second screen device 1420 may receive the first application information-obtaining action through the network interface 1424. Furthermore, the controller 1423 of the second screen device 1420 may transmit application information to the first screen device 1410 in response to the first application information-obtaining action. In this case, the application information may be information related to a specific application determined based on the input information of the first application information-obtaining action. The input information may include at least one of the application identifier 2110, the reference information 2120, the device profile information 2130, and the filter information 2140.

FIG. 22 shows a second application information-obtaining action and arguments thereof according to an embodiment to which the present invention may be applied.

The second application information-obtaining action 2200 may enable a screen control point to obtain only application information specified by an application identifier. Furthermore, the name of the second application information-obtaining action may be indicated as SimpleGetAppInfo( ).

The arguments of the second application information-obtaining action may include at least one an application identifier 2210 and application information 2220.

In this case, the description of FIG. 21 may be applied to the application identifier 2210 and the application information 222.

The embodiment of FIG. 22 may be performed by the elements of FIG. 14. For example, the controller 1413 of the first screen device 1410 may transmit the second application information-obtaining action to the second screen device 1420 through the network interface 1414.

The controller 1423 of the second screen device 1420 may receive the second application information-obtaining action through the network interface 1424. Furthermore, the controller 1423 of the second screen device 1420 may transmit application information to the first screen device 1410 in response to the second application information-obtaining action. In this case, the application information may be information related to a specific application determined based on the input information of the second application information-obtaining action. The input information may include the application identifier 2210.

FIG. 23 shows an available application information-obtaining action and arguments thereof according to an embodiment to which the present invention may be applied.

The available application information-obtaining action 2300 may enable information related to an available application to be obtained from an action reception device. Furthermore, the name of the available application information-obtaining action 2300 may be indicated as GetAvailableApp( ) 2300.

The arguments of the available application information-obtaining action 2300 may include at least one of an application identifier 2310, reference information 2320, device profile information 2330, filter information 2340, and available application information 2350.

In this case, the description of FIG. 21 may be applied to the application identifier 2310, the reference information 2320, the device profile information 2330, and the filter information 2340.

The available application information 2350 may mean information related to an available application in order to provide a multi-screen service.

The embodiment of FIG. 23 may be performed by the elements of FIG. 14. For example, the controller 1413 of the first screen device 1410 may transmit the available application information-obtaining action 2300 to the second screen device 1420 through the network interface 1414.

The controller 1423 of the second screen device 1420 may receive the available application information-obtaining action 1400 through the network interface 1424. Furthermore, the controller 1423 of the second screen device 1420 may transmit available application information to the first screen device 1410 in response to the available application information-obtaining action 2300. In this case, the available application information may be determined based on the input information of the second application information-obtaining action. The input information may include at least one of the application identifier 2310, the reference information 2320, the device profile information 2330, and the filter information 2340.

FIG. 24 shows a running application information-obtaining action and an argument thereof according to an embodiment to which the present invention may be applied.

The running application information-obtaining action 2400 may enable a screen control point to obtain a list of applications that are being executed. Furthermore, the name of the running application information-obtaining action 2400 may be indicated as GetRunningApp( ).

The arguments of the running application information-obtaining action 2400 may include application information 2410 that is running.

In this case, the application information 2410 that is running may mean a list of applications that are being executed. For example, the application information 2410 that is running may mean a list of the identifiers of applications in which a variable "running status information ("RunningStatus") included in an application information list has been set as "Running."

The embodiment of FIG. 24 may be performed by the elements of FIG. 14. For example, the controller 1413 of the first screen device 1410 may transmit the running application information-obtaining action 2400 to the second screen device 1420 through the network interface 1414.

The controller 1423 of the second screen device 1420 may receive the running application information-obtaining action 2400 through the network interface 1424. Furthermore, the controller 1423 of the second screen device 1420 may transmit application information that is running to the first screen device 1410 in response to the running application information-obtaining action 2400.

FIG. 25 shows a running status information-obtaining action and arguments thereof according to an embodiment to which the present invention may be applied.

The running status information-obtaining action 2500 may enable a screen control point to obtain running status information about an application specified by an application identifier. Furthermore, the name of the running status information-obtaining action 2500 may be indicated as GetRunningStatus( ).

The arguments of the running status information-obtaining action 2500 may include an application identifier 2510 and running status information 2520.

In this case, the application identifier 2510 is indicative of an application for obtaining running status information. The contents described in connection with the aforementioned embodiments may be likewise applied to the application identifier 2510.

The running status information "RunningStatus" 2520 may be indicative of a specific portion of an application information list. The running status information 2520 may include the components and attributes of an application specified by the application identifier 2510 and running status components thereof.

The embodiment of FIG. 25 may be performed by the elements of FIG. 14. For example, the controller 1413 of the first screen device 1410 may transmit the running status information-obtaining action 2500 to the second screen device 1420 through the network interface 1414.

The controller 1423 of the second screen device 1420 may receive the running status information-obtaining action 2500 through the network interface 1424. Furthermore, the controller 1423 of the second screen device 1420 may transmit the running status information 2520 of an application that is running to the first screen device 1410 in response to the running status information-obtaining action 2500.

FIG. 26 shows a first application activation action and arguments thereof according to an embodiment to which the present invention may be applied.

The first application activation action 2600 may enable an application, included in an application information list, to run on a screen device. The application may be identified by an application identifier. Furthermore, the first application activation action 2600 may be used to provide the activation parameter information of an application that is running. Furthermore, the name of the first application activation action 2600 may be indicated as ActivateAppByID( ).

The arguments of the first application activation action 2600 may include an application identifier 2610 and parameter information 2620.

In this case, the application identifier 2610 is indicative of an application to be activated. The contents described in connection with the aforementioned embodiments may be likewise applied to the application identifier 2610.

The parameter information 2620 may be indicative of a parameter type. For example, the parameter type may be indicative of any one of activation parameter information and installation parameter information.

The embodiment of FIG. 26 may be performed by the elements of FIG. 14. For example, the controller 1413 of the first screen device 1410 may transmit the first application activation action 2600 to the second screen device 1420 through the network interface 1414.

The controller 1423 of the second screen device 1420 may receive the first application activation action 2600 through the network interface 1424. Furthermore, the controller 1423 of the second screen device 1420 may activate an application within the second screen device 1420 in response to the first application activation action 2600.

FIG. 27 shows a second application activation action and arguments thereof according to an embodiment to which the present invention may be applied.

The second application activation action 2700 may enable an application to run on a screen device using a URI. Furthermore, the second application activation action 2700 may be used to provide activation parameter information about an application that is subjected to transitioning pending input. Furthermore, the name of the second application activation action 2700 may be indicated as ActivateAppByURI( ).

The arguments of the second application activation action 2700 may include at least one of activation URI information 2710, application information 2720, parameter information 2730, and an application identifier 2740.

In this case, the activation URI information 2710 is indicative of information about a URI from which an application will start.

The application information 2720 may be indicative of a specific portion of an application information list variable and may provide additional information about an application to be started. For example, the application information 2720 may include a name set by a user.

The parameter information 2730 may be indicative of a parameter type. For example, the parameter type may be indicative of any one of activation parameter information and installation parameter information.

The application identifier 2740 may be indicative of the identifier of a newly assigned application or may be indicative of the identifier of an application having the same URI as that of the activation URI information 2710. If an application is not installed and may be started using a URI and the activation URI information 2710 is not included in the application information list variable of a screen device, the screen device may start the application through the second application activation action 2700.

For example, when receiving the second application activation action 2700, a screen device may generate a new application component in an application information list. In this case, the new application component may include activation URI information and additional information. Furthermore, a new value may be assigned to an application identifier, and the new value may be returned through the application identifier 2740.

The embodiment of FIG. 27 may be performed by the elements of FIG. 14. For example, the controller 1413 of the first screen device 1410 may transmit the second application activation action 2700 to the second screen device 1420 through the network interface 1414.

The controller 1423 of the second screen device 1420 may receive the second application activation action 2700 through the network interface 1424. Furthermore, the controller 1423 of the second screen device 1420 may activate an application within the second screen device 1420 in response to the second application activation action 2700. That is, the controller 1423 may activate an application based on information about a URI from which the application will start. The activated application may be returned through the display 1421.

FIG. 28 shows a deactivation action and arguments thereof according to an embodiment to which the present invention may be applied.

The deactivation action 2800 may enable a designated application to be stopped by an application identifier on a screen device. The name of the deactivation action 2800 may be indicated as DeactivateApp( ).

The arguments of the deactivation action 2800 may include an application identifier 2810 and a stopped application identifier 2820.

In this case, the application identifier 2810 is indicative of an application to be deactivated. The contents described in connection with the aforementioned embodiments may be likewise applied to the application identifier 2810.

The stopped application identifier 2820 is indicative of a list of the identifiers of stopped applications.

The embodiment of FIG. 28 may be performed by the elements of FIG. 14. For example, the controller 1413 of the first screen device 1410 may transmit the deactivation action 2800 to the second screen device 1420 through the network interface 1414.

The controller 1423 of the second screen device 1420 may receive the deactivation action 2800 through the network interface 1424. Furthermore, the controller 1423 of the second screen device 1420 may stop an application within the second screen device 1420 in response to the deactivation action 2800. The stopped application may be controlled by a user through the user interfaces 1412 and 1422.

FIG. 29 shows a first application installation action and arguments thereof according to an embodiment to which the present invention may be applied.

The first application installation action 2900 may enable an application to be installed on a screen device using information included in an application information list. Furthermore, the first application installation action 2900 may be used to provide the installation parameter information of an application that is subjected to installing-pending input. Furthermore, if the latest version is present, the first application installation action 2900 may be used to update an installed application with the latest version. The name of the first application installation action 2900 may be indicated as InstallAppByID( ).

The arguments of the first application installation action 2900 may include an application identifier 2910 and parameter information 2920.

In this case, the application identifier 2910 is indicative of an application to be installed. The contents described in connection with the aforementioned embodiments may be likewise applied to the application identifier 2910.

The parameter information 2920 may be indicative of a parameter type. For example, the parameter type may be indicative of any one of activation parameter information and installation parameter information.

The embodiment of FIG. 29 may be performed by the elements of FIG. 14. For example, the controller 1413 of the first screen device 1410 may transmit the first application installation action 2900 to the second screen device 1420 through the network interface 1414. In this case, the first application installation action 2900 may include the application identifier 2910 and the parameter information 2920 as input information.

The controller 1423 of the second screen device 1420 may receive the first application installation action 2900 through the network interface 1424. Furthermore, the controller 1423 of the second screen device 1420 may install an application in response to the first application installation action 2900.

FIG. 30 shows a second application installation action and arguments thereof according to an embodiment to which the present invention may be applied.

The second application installation action 3000 may enable an application to be installed on a screen device using a URI. Furthermore, the second application installation action 3000 may be used to provide the installation parameter information of an application that is subjected to installing-pending input. Furthermore, the name of the second application installation action 3000 may be indicated as InstallAppByURI.

The arguments of the second application installation action 3000 may include at least one of installation URI information 3010, application information 3020, parameter information 3030, and an application identifier 3040.

In this case, the installation URI information 3010 is indicative of information about a URL at which an application will be installed.

The application information 3020 may be indicative of a specific portion of an application information list variable and may provide additional information about an application to be installed. For example, the application information 3020 may include a name set by a user.

The parameter information 3030 may be indicative of a parameter type. For example, the parameter type may be indicative of any one of activation parameter information and installation parameter information.

The application identifier 3040 may be indicative of the identifier of a newly assigned application or may be indicative of the identifier of an application having the same URI as that of the installation URI information 3010. If the installation URI information 3010 is not included in the application information list variable of a screen device, the second application installation action 3000 may enable an application to be installed on a screen device.

For example, when the controller 1423 of the second screen device 1420 receives the second application installation action 3000 through the network interface 1424, it may generate a new application component within an application information list variable. In this case, the new application component may include installation URI information and additional information. Furthermore, the controller 1423 may assign a new value to an application identifier and return the new value through the application identifier 3040. The controller 1423 may transmit the application identifier 3040 to which the new value has been assigned to the first screen device 1410 through the network interface 1424.

FIG. 31 shows an uninstallation action and arguments thereof according to an embodiment to which the present invention may be applied.

The uninstallation action 3100 may enable an application designated by an application identifier to be uninstalled from a screen device. The name of the uninstallation action 3100 may be indicated as UninstallApp( ).

The arguments of the uninstallation action 3100 may include an application identifier 3110 and an uninstalled application identifier 3120.

In this case, the application identifier 3110 may be indicative of an application to be uninstalled. The contents described in connection with the aforementioned embodiments may be likewise applied to the application identifier 3110.

The uninstalled application identifier 3120 is indicative of a list of the identifiers of uninstalled applications.

The embodiment of FIG. 31 may be performed by the elements of FIG. 14. For example, the controller 1413 of the first screen device 1410 may transmit the uninstallation action 3100 to the second screen device 1420 through the network interface 1414. In this case, the uninstallation action 3100 may include the application identifier 3110 as input information.

The controller 1423 of the second screen device 1420 may receive the uninstallation action 3100 through the network interface 1424. Furthermore, the controller 1423 of the second screen device 1420 may transmit the identifier of an uninstalled application to the first screen device 1410 in response to the uninstallation action 3100.

FIG. 32 shows an installation status information-obtaining action and arguments thereof according to an embodiment to which the present invention may be applied.

The installation status information-obtaining action 3200 may enable a screen control point to obtain installation status information about an application specified by an application identifier. Furthermore, the name of the installation status information-obtaining action 3200 may be indicated as GetAppInstallationStatus( ).

The arguments of the installation status information-obtaining action 3200 may include an application identifier 3210 and installation status information 3220.

In this case, the application identifier 3210 may be indicative of an application for obtaining installation status information. The contents described in connection with the aforementioned embodiments may be likewise applied to the application identifier 3210.

The installation status information "InstallationStatus" 3220 may be indicative of a specific portion of an application information list. The installation status information 3220 may include the components and attributes of an application specified by the application identifier 3210 and an installation status component thereof. For example, the installation status component may include "Installation Completed", "Download Pending", and "Installation Pending."

The embodiment of FIG. 32 may be performed by the elements of FIG. 14. For example, the controller 1413 of the first screen device 1410 may transmit the installation status information-obtaining action 3200 to the second screen device 1420 through the network interface 1414.

In this case, the installation status information-obtaining action 3200 may include the application identifier 3210 as input information.

The controller 1423 of the second screen device 1420 may receive the installation status information-obtaining action 3200 through the network interface 1424. Furthermore, the controller 1423 of the second screen device 1420 may transmit any one of the pieces of installation status information, that is, "Installation Completed", "Download Pending", and "Installation Pending", to the first screen device 1410 in response to the installation status information-obtaining action 3200.

FIG. 33 shows a connection information-obtaining action and arguments thereof according to an embodiment to which the present invention may be applied.

The connection information-obtaining action 3300 may enable a screen control point to obtain information about the connection of applications specified by an application identifier. Furthermore, the name of the connection information-obtaining action 3300 may be indicated as GetAppConnectionInfo( ).

The arguments of the connection information-obtaining action 3300 may include an application identifier 3310 and connection information 3320.

In this case, the application identifier 3310 may be indicative of an application for obtaining connection information. The contents described in connection with the aforementioned embodiments may be applied to the application identifier 3310.

The connection information 3320 may be indicative of a specific portion of an application information list. The connection information 3320 may include the components and attributes of applications specified by the application identifier 3310 and information components between the applications. For example, the information components between the applications may include at least one of specific protocol name information, transport protocol information, and connection address information. In this case, the connection address information may mean access information for communication between the applications.

The embodiment of FIG. 33 may be performed by the elements of FIG. 14. For example, the controller 1413 of the first screen device 1410 may transmit the connection information-obtaining action 3300 to the second screen device 1420 through the network interface 1414. In this case, the connection information-obtaining action 3300 may include the application identifier 3310 as input information.

The controller 1423 of the second screen device 1420 may receive the connection information-obtaining action 3300 through the network interface 1424. Furthermore, the controller 1423 of the second screen device 1420 may transmit the connection information 3320, for example, at least one of the specific protocol name information, the transport protocol information, and the connection address information to the first screen device 1410 in response to the connection information-obtaining action 3300.

The first screen device 1410 and the second screen device 1420 are connected through the network interfaces 1414 and 1424 based on the connection information 3320, thus being capable of communicating with each other.

FIG. 34 shows an apptoapp connection action and arguments thereof according to an embodiment to which the present invention may be applied.

The apptoapp connection action 3400 is used to configure a screen device and an apptoapp connection and enables connection management. The name of the apptoapp connection action 3400 may be indicated as ConnectApptoApp( ).

The arguments of the apptoapp connection action 3400 may include an application identifier 3410 and a connection identifier 3420.

In this case, the application identifier 3410 is indicative of an application for configuring a screen device and an apptoapp connection.

The connection identifier 3420 is indicative of the identifier of the configured apptoapp connection and may be assigned by a screen device.

The embodiment of FIG. 34 may be performed by the elements of FIG. 14. For example, the controller 1413 of the first screen device 1410 may transmit the apptoapp connection action 3400 to the second screen device 1420 through the network interface 1414. In this case, the apptoapp connection action 3400 may include the application identifier 3410 as input information.

The controller 1423 of the second screen device 1420 may receive the apptoapp connection action 3400 through the network interface 1424. Furthermore, the controller 1423 of the second screen device 1420 may transmit the connection identifier 3420 to the first screen device 1410 in response to the apptoapp connection action 3400.

The first screen device 1410 and the second screen device 1420 may perform a connection for providing a multi-screen service based on the connection identifier 3420.

FIG. 35 shows an apptoapp disconnection (i.e., a disconnection between applications) action and arguments thereof according to an embodiment to which the present invention may be applied.

The application disconnection action 3500 may be used to disconnect an apptoapp connection, specified by a connection identifier, from a screen device. The name of the application disconnection action 3500 may be indicated as DisconnectApptoApp( ).

The arguments of the application disconnection action 3500 may include a connection identifier 3510 and a disconnected connection identifier 3520.

In this case, the connection identifier 3510 is indicative of a connection to be disconnected, and the disconnected connection identifier 3520 is indicative of a list of the identifiers of disconnected apptoapp disconnections.

The embodiment of FIG. 35 may be performed by the elements of FIG. 14. For example, the controller 1413 of the first screen device 1410 may transmit the application disconnection action 3500 to the second screen device 1420 through the network interface 1414. In this case, the application disconnection action 3500 may include the connection identifier 3510 as input information.

The controller 1423 of the second screen device 1420 may receive the application disconnection action 3500 through the network interface 1424. Furthermore, the controller 1423 of the second screen device 1420 may transmit the disconnected connection identifier 3520 to the first screen device 1410 in response to the application disconnection action 3500.

A connection between the first screen device 1410 and the second screen device 1420 is disconnected based on the disconnected connection identifier 3520.

FIG. 36 shows a current connection information-obtaining action and arguments thereof according to an embodiment to which the present invention may be applied.

The current connection information-obtaining action 3600 enables a screen control point to collect apptoapp connection information which has been established by the apptoapp connection action and which is now supported by a screen device. The name of the current connection information-obtaining action 3600 may be indicated as Get-CurentConnectionInfo( ).

The arguments of the current connection information-obtaining action 3600 may include a connection identifier 3610 and connection application identifiers 3620.

In this case, the connection identifier 3610 may be indicative of the identifier of a current apptoapp connection.

The connection application identifiers 3620 may be indicative of application identifiers corresponding to an apptoapp connection.

The embodiment of FIG. 36 may be performed by the elements of FIG. 14. For example, the controller 1413 of the first screen device 1410 may transmit the current connection information-obtaining action 3600 to the second screen device 1420 through the network interface 1414. In this case, the current connection information-obtaining action 3600 may include the connection identifier 3610 as input information.

The controller 1423 of the second screen device 1420 may receive the current connection information-obtaining action 3600 through the network interface 1424. Furthermore, the controller 1423 of the second screen device 1420 may transmit application identifiers corresponding to an apptoapp connection to the first screen device 1410 in response to the current connection information-obtaining action 3600.

FIG. 37 shows a searchable field-obtaining action and an argument thereof according to an embodiment to which the present invention may be applied.

The searchable field-obtaining action 3700 may enable a screen control point to obtain supported searchable field information. The name of the searchable field-obtaining action 3700 may be indicated as GetSupportedTargetFields ( ).

The argument of the searchable field-obtaining action 3700 may include supported searchable field information 3710. In this case, the supported searchable field information 3710 is indicative of a list of searchable fields. This may be a component of the application information list of a screen device. The supported searchable field information 3710 may include at least one of an application name and protocol name generated by a user.

The embodiment of FIG. 37 may be performed by the elements of FIG. 14. For example, the controller 1413 of the first screen device 1410 may transmit the searchable field-obtaining action 3700 to the second screen device 1420 through the network interface 1414.

The controller 1423 of the second screen device 1420 may receive the searchable field-obtaining action 3700 through the network interface 1424. Furthermore, the controller 1423 of the second screen device 1420 may transmit the supported searchable field information 3710, for example, at least one of an application name and protocol name generated by a user to the first screen device 1410 in response to the searchable field-obtaining action 3700.

FIG. 38 shows state variables for application management according to an embodiment to which the present invention may be applied.

In an embodiment of the present invention, state variables for application management may include at least one of an application information list 3801, available application information 3802, searchable field information 3803, an application identifier 3804, search information 3805, searchable field information 3806, filter information 3807, a running application list 3808, URI information 3809, parameter information 3810, and a connection identifier 3811.

The application information list 3801 may include information about all of applications owned by a screen device for a multi-screen service. The application information list 3801 may be represented in an XML template form and may include a sub-component structure.

For example, the application information list 3801 may include an application component. If the number of application components is plural, the application information list 3801 may be indicative of a structure including the attributes and sub-components of applications for each application.

The application component may include at least one of an application identifier, a market application identifier component, a user description component, a replacement identifier component, a function element, a running status component, an activation URI component, an installation status component, a downloading status component, an installing status component, an installation URI component, a user policy component, an apptoapp information component, and an icon list component.

The application identifier is indicative of the unique identifier of an application within an application management service.

The market application identifier component is indicative of the identifier of an application assigned by an application market and may include market information and version information. In this case, the market information is indicative of the identifier of a digital platform through which the application is provided. The version information is indicative of the version of the application.

The user description component is indicative of the description words of an application generated by a user, and may include language information.

The replacement identifier component is indicative of the identifier of an application used in a standard institute, and may include institute information. The institute information may mean the domain name of the standard institute.

The running status component is indicative of the activation status of an application on a screen device. The activation status may be indicative of one of "Deactivation", "Transitioning", "Transitioning Pending Input", "Running", and "Unknown."

The activation URI component is indicative of a URI which may be accessible to a screen control point in order to start an application, and may include device type information. In this case, the device type information is indicative of a device type to which an application may be applied. The device type may mean a main screen device or a companion screen device or both.

The installation status component is indicative of the installation status of an application designated by an application identifier on a screen device. The installation status may be indicative of one of "Not Downloaded", "Downloading", "Downloading-Pending Input", "Not Installed", "Installing", "Installation-Pending Input", "Installation Completed", and "Unknown."

The downloading status component is applied only when the installation status component is "Downloading." The degree of downloading may be represented as a percentage between 0 and 100.

The installing status component is applied only when the installation status component is "Installing." The degree of installing may be represented as a percentage between 0 and 100.

The installation URI component is indicative of a URI which may be accessible to a screen control point in order to install an application, and may include device type information. In this case, the device type information is indicative of a device type to which the application may be applied. The device type may mean a main screen device or a companion screen device or both.

The user policy component is indicative of permission-related information for an application use. The permission-related information may be indicative of one of "No Restriction", "Purchase Required", "Trial Only", "Parental Consent Required", and "Login Required."

The apptoapp information component is indicative of information for generating an apptoapp connection and may be supported if the running status component is at least "Running." The apptoapp information component may include at least one of a matching protocol name component, a protocol component, and a connection address component. The matching protocol name component is indicative of a manufacturer-defined protocol name. The protocol component is indicative of the protocol of a transport layer and may include, for example, an HTTP, a websocket, and UPnP. The connection address component is indicative of access information for communication between applications. The connection address component may include, for example, an HTTP URI, a websocket URI, an uuid:device-uuid, and a manufacturer-defined address.

The available application information 3802 is indicative of information about applications available in a corresponding time in order to provide a multi-screen service.

The supported searchable field information 3803 is indicative of a list of searchable fields.

The application identifier argument 3804 provides information about the type of various application identifiers within various actions.

The search information argument 3805 is indicative of information about the type of search information.

The searchable field information argument 3806 is indicative of information about the type of searchable field information.

The filter information argument 3807 is indicative of information used to obtain application information that satisfies a specific condition.

The running application list 3808 provides a list of applications that are running.

The URI information argument 3809 is indicative of information about the type of any one of an activation URI argument and an installation URI argument.

The parameter information argument 3810 is indicative of information about the type of any one of an activation parameter argument and an installation parameter argument.

The connection identifier argument 3811 is indicative of a list of the unique identifiers of apptoapp connections.

Figure 39:
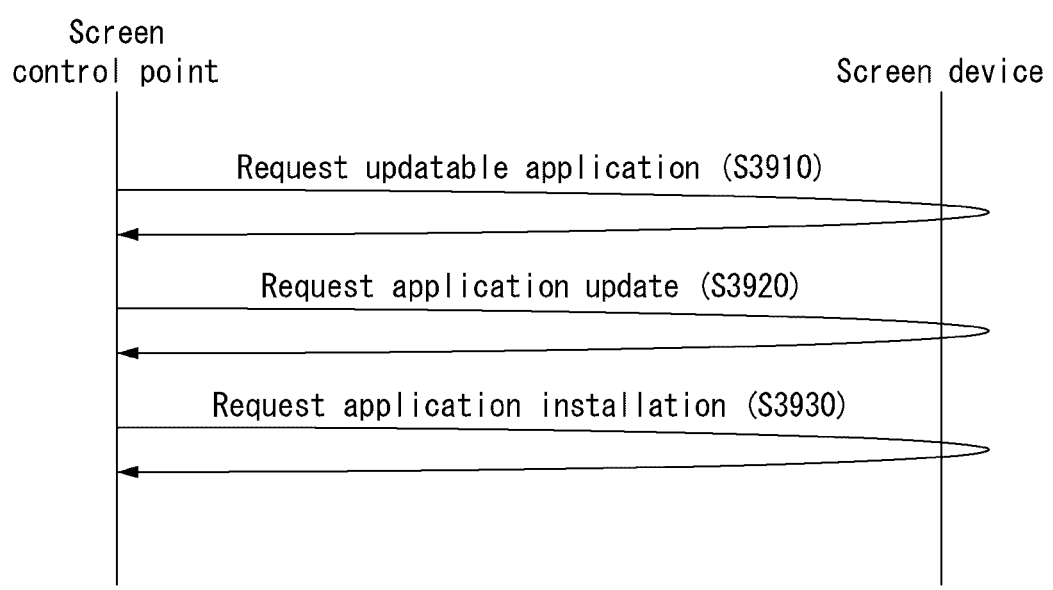
FIG. 39 shows a process for updating an application according to an embodiment to which the present invention may be applied.

FIG. 39 shows a process for updating an application according to an embodiment to which the present invention may be applied.

In order to update an application for providing a multi-screen service, at least one of an updatable application-obtaining action and an application update action may be required.

A screen control point may request a screen device to obtain an updatable application (S3910). In this case, an updatable application-obtaining action may be used. The updatable application-obtaining action may enable the screen control point to obtain a list of applications whose version may be updated. The screen device may transmit the list of applications whose version may be updated to the screen control point in response to the updatable application-obtaining action.

The screen control point may request an application update for applications not having the latest version (S3920). In this case, an application update action may be used. The application update action may include version information. If the version information has nothing information, it may mean that an application needs to be updated with the latest version. In response to the request, the screen device may update the applications not having the latest version with the latest version.

The screen control point may request the screen device to install the updated application thereon (S3930). In this case, an application installation action may be used. The application installation action may be installed based on an application identifier or may be performed based on an installation Uniform Resource Identifier (URI).

Figure 40:
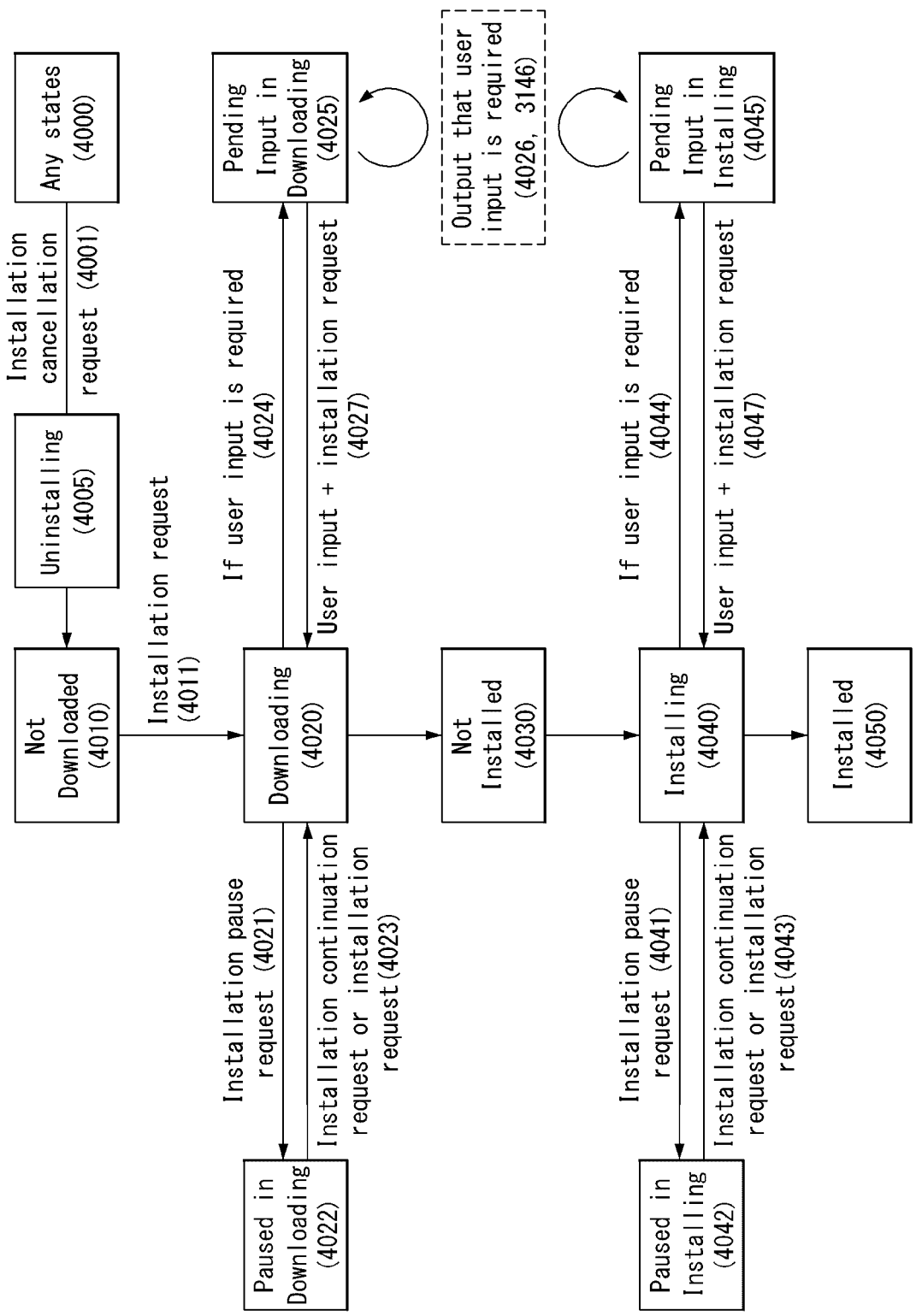
FIG. 40 shows the state diagram of the installation of an application according to an embodiment to which the present invention may be applied.

FIG. 40 shows the state diagram of the installation of an application according to an embodiment to which the present invention may be applied.

First, if an application has not been downloaded (4010), a user may request application installation through a screen control point (4011). In this case, it may consider that the application has not been downloaded although the application is uninstalled (4005) in response to an installation cancellation request (4001) if the application has any state (4000).

In response to the installation request, a screen device may download the application (4020). In this case, if there is an installation pause request from a user (4021), the downloading of the application is paused (4022). When an installation continuation request or an installation request is received from the user (4023), the screen device may continue to download the application (4020).

Alternatively, if the user's input is required during the downloading (4024), the screen device may be in the user pending input state in the download process (4025). In this case, the screen device may display that it is in the user pending input state (4026). When an installation request is received along with the user's input (4027), the screen device continues to download the application (4020).

The screen device may be in an installation uncompleted state during downloading (4030) and may become an installing state (4040). In this case, if there is an installation pause request from the user (4041), the installation of the application is paused (4042). When an installation continuation request or an installation request is received from the user (4043), the screen device may continue to install the application (4040).

Alternatively, if the user's input is required during the installation (4044), the screen device may be in the user pending input state in the installation process (4045). In this case, the screen device may display that it is in the user pending input state (4046). When an installation request is received along with the user's input (4047), the screen device may continue to install the application (4040).

When the installation is completed, the screen device becomes an installation completed state (4050).

The various embodiments described in this specification may be implemented in a recording medium readable by a computer or similar devices using software or hardware or a combination of them, for example.

According to a hardware implementation, an embodiment described herein may be implemented using at least one of Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and other electrical units for executing functions. In some cases, the embodiments described in this specification may be implemented using the controller or the control point.

According to a software implementation, embodiments, such as procedures or functions, may be implemented along with a software module for performing at least one function or operation. Software code may be implemented by a software application written in a proper program language. The software code may be stored in the memory and executed by the control unit.

In accordance with an embodiment of the present invention, the aforementioned method may be implemented in a medium on which a program has been recorded in the form of processor-readable code. The processor-readable medium may include ROM, RAM, CD-ROM, a magnetic tape, a floppy disk, and an optical data storage device, for example. Furthermore, the processor-readable medium includes an implementation in the form of carrier waves (e.g., transmission through the Internet).

INDUSTRIAL APPLICABILITY

The configurations and methods of the aforementioned embodiments are not limited and applied to the devices described above, and the embodiments may be constructed by selectively combining part of or the entire of each of the embodiments so that they are modified in various ways.

The invention claimed is:

1. A method for managing applications of a broadcasting reception device and a companion device connected over a network, the method comprising:
receiving, by the broadcasting reception device, a broadcasting signal;
generating, by the broadcasting reception device, an application information list variable based on application information included in the broadcasting signal,
wherein the application information list variable includes information for at least one application of the broadcasting reception device;
receiving, by the broadcasting reception device, an application information-obtaining action from the companion device,
wherein the application information-obtaining action is indicative of a request message for obtaining information related to a specific application; and
transmitting, by the broadcasting reception device, an application information list variable corresponding to the specific application in response to the application information-obtaining action,
the method further comprising:
transmitting an application running action or an application installation action to the companion device based on the information of the specific application,
wherein the application running action comprises an identifier and running parameter of the specific application, and the application installation action comprises an identifier and installation parameter of the specific application.

2. The method of claim 1, further comprising extracting media content and the application information from the broadcasting signal through an Advanced Television Systems Committee (ATSC) 3.0 protocol stack, wherein the broadcasting signal is transmitted through at least one of a broadcast network and a broadband network.

3. The method of claim 2, wherein the at least one specific application is identified by an application identifier included in the application information-obtaining action.

4. The method of claim 2, further comprising:
receiving a connection information-obtaining action from the companion device, wherein the connection information-obtaining action is used to obtain connection information between applications of the broadcasting reception device and the companion device;
transmitting the connection information to the companion device in response to the connection information-obtaining action, wherein the connection information comprises at least one of protocol information and connection address information; and
performing a connection between the applications of the broadcasting reception device and the companion device based on the connection information.

5. The method of claim 2, wherein the broadcasting reception device supports at least one of an application management service, an application connection setup service, or a synchronization service between devices.

6. The method of claim 2, further comprising:
executing a specific application within the broadcasting reception device based on application trigger information; and
transmitting information related to the specific application to the companion device,
wherein the application trigger information is included in the extracted application information.

7. The method of claim 6, wherein the application information list variable includes application-to-application information for generating an application-to-application connection.

8. A broadcasting reception device for managing a connection with an application within a companion device connected to the broadcasting reception device over a network, the broadcasting reception device comprising:
a tuner configured to receive a broadcasting signal; and
a controller configured to:
generate an application information list variable based on application information included in the broadcasting signal,
wherein the application information list variable includes information for at least one application of the broadcasting reception device, and transmit an application information list variable corresponding to a specific application in response to an application information-obtaining action received from the companion device,
wherein the application information-obtaining action is indicative of a request message for obtaining information related to the specific application,
wherein the controller is further configured to:
    transmit an application running action or an application installation action to the companion device based on the information of the specific application,
wherein the application running action comprises an identifier and running parameter of the specific application, and the application installation action comprises an identifier and installation parameter of the specific application.

9. The broadcasting reception device of claim 8, wherein:
the controller extracts media content and the application information from the broadcasting signal through an Advanced Television Systems Committee (ATSC) 3.0 protocol stack, and
the broadcasting signal is transmitted through at least one of a broadcast network and a broadband network.

10. The broadcasting reception device of claim 9, wherein the at least one specific application is identified by an application identifier included in the application information-obtaining action.

11. The broadcasting reception device of claim 9, further comprising a network interface configured to receive a connection information-obtaining action from the companion device,
wherein the connection information-obtaining action is used to obtain connection information between applications of the broadcasting reception device and the companion device,
wherein the controller transmits the connection information to the companion device in response to the connection information-obtaining action and performs a connection between applications of the broadcasting reception device and the companion device based on the connection information, and
wherein the connection information comprises at least one of protocol information and connection address information.

12. The broadcasting reception device of claim 9, wherein the broadcasting reception device supports at least one of an application management service, an application connection setup service, and a synchronization service between devices.

13. The broadcasting reception device of claim 9, wherein:
the controller executes a specific application within the broadcasting reception device based on application trigger information and transmits information related to the specific application to the companion device, and
the application trigger information is included in the extracted application information.

14. The broadcasting reception device of claim 13, wherein the application information list variable includes application-to-application information being information for generating an application-to-application connection.

* * * * *